(12) United States Patent
Park et al.

(10) Patent No.: US 12,147,120 B2
(45) Date of Patent: Nov. 19, 2024

(54) DISPLAY DEVICE WITH REFLECTIVE SHEET HAVING COLOR CONVERTING LIGHT PATTERNS

(71) Applicant: LG ELECTRONICS INC., Seoul (KR)

(72) Inventors: Jihee Park, Seoul (KR); Jihye Yoon, Seoul (KR); Kilhoon Lee, Seoul (KR); Kiryong Jeong, Seoul (KR); Keonwoo Kim, Seoul (KR); Nayeon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/280,117

(22) PCT Filed: Feb. 16, 2022

(86) PCT No.: PCT/KR2022/002262
§ 371 (c)(1),
(2) Date: Sep. 1, 2023

(87) PCT Pub. No.: WO2022/250250
PCT Pub. Date: Dec. 1, 2022

(65) Prior Publication Data
US 2024/0160064 A1    May 16, 2024

(30) Foreign Application Priority Data
May 24, 2021   (KR) .................. 10-2021-0066019

(51) Int. Cl.
*G02F 1/13357*   (2006.01)
*G02F 1/1335*   (2006.01)

(52) U.S. Cl.
CPC .. *G02F 1/133611* (2013.01); *G02F 1/133603* (2013.01); *G02F 1/133605* (2013.01); *G02F 1/133608* (2013.01); *G02F 1/133614* (2021.01)

(58) Field of Classification Search
CPC ......... G02F 1/133611; G02F 1/133603; G02F 1/133605; G02F 1/133608; G02F 1/133614
See application file for complete search history.

(56) References Cited

U.S. PATENT DOCUMENTS

| 2016/0138779 | A1* | 5/2016 | Oh | ...................... G02F 1/133605 362/97.1 |
| 2018/0156417 | A1* | 6/2018 | Oh | .......................... F21V 7/0066 |
| 2023/0121964 | A1* | 4/2023 | Oh | .......................... F21V 7/0066 362/97.1 |

FOREIGN PATENT DOCUMENTS

| KR | 10-2016-0051570 | 5/2016 |
| KR | 10-2018-0132370 | 12/2018 |

(Continued)

OTHER PUBLICATIONS

PCT International Application No. PCT/KR2022/002262, International Search Report dated Aug. 26, 2022, 3 pages.

*Primary Examiner* — Tracie Y Green
(74) *Attorney, Agent, or Firm* — LEE, HONG, DEGERMAN, KANG & WAIMEY

(57) ABSTRACT

A display device of the present disclosure includes: a display panel; a frame which is positioned in a rearward direction of the display panel, and to which the display panel is coupled; a substrate which is positioned between the display panel and the frame, and fixed to the frame; a plurality of light sources mounted on the substrate to form a row and a column; a reflective sheet which is positioned on the substrate, and has a plurality of holes through which each of the (Continued)

plurality of light sources passes; and a light pattern which is formed on the reflective sheet, and converts a color of a light provided by the plurality of light sources, wherein the reflective sheet includes: a first hole positioned adjacent to an edge of the reflective sheet; a second hole which is positioned adjacent to the first hole and positioned farther than the first hole from the edge of the reflective sheet; a first area positioned around the first hole; and a second area positioned around the second hole, wherein the light pattern includes: a first light pattern positioned in the first area; and a second light pattern positioned in the second area, wherein an area of the first light pattern is larger than an area of the second light pattern.

11 Claims, 16 Drawing Sheets

(56) References Cited

FOREIGN PATENT DOCUMENTS

| KR | 10-2020523 | 9/2019 |
| KR | 10-2155320 | 9/2020 |
| WO | 2011074334 | 6/2011 |

* cited by examiner

【Figure 1】
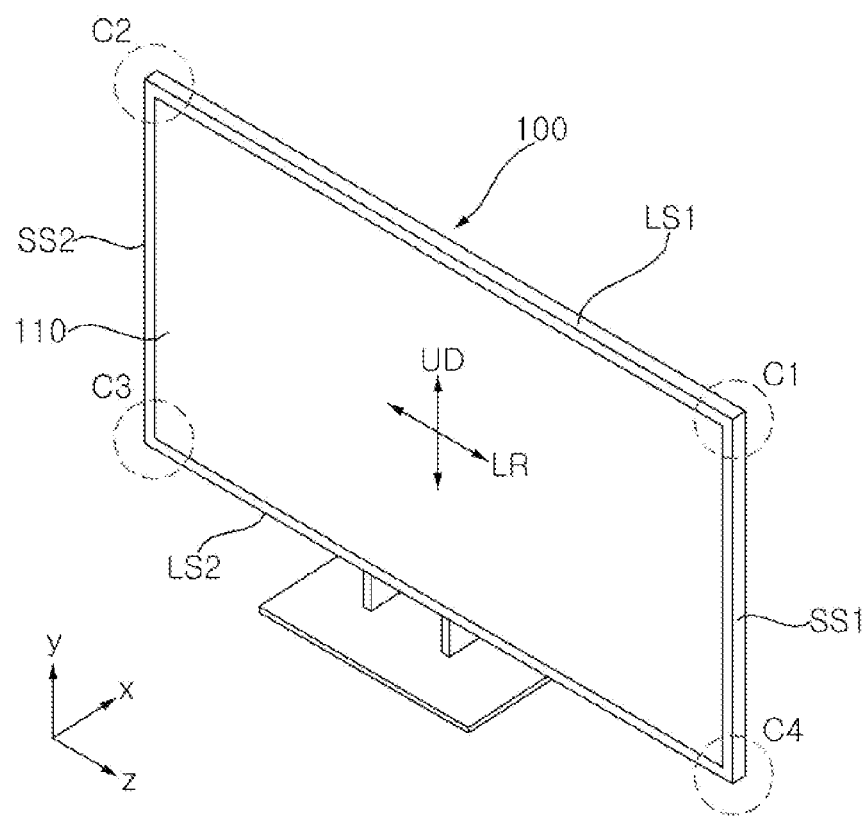
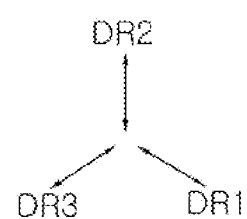

[Figure 2]
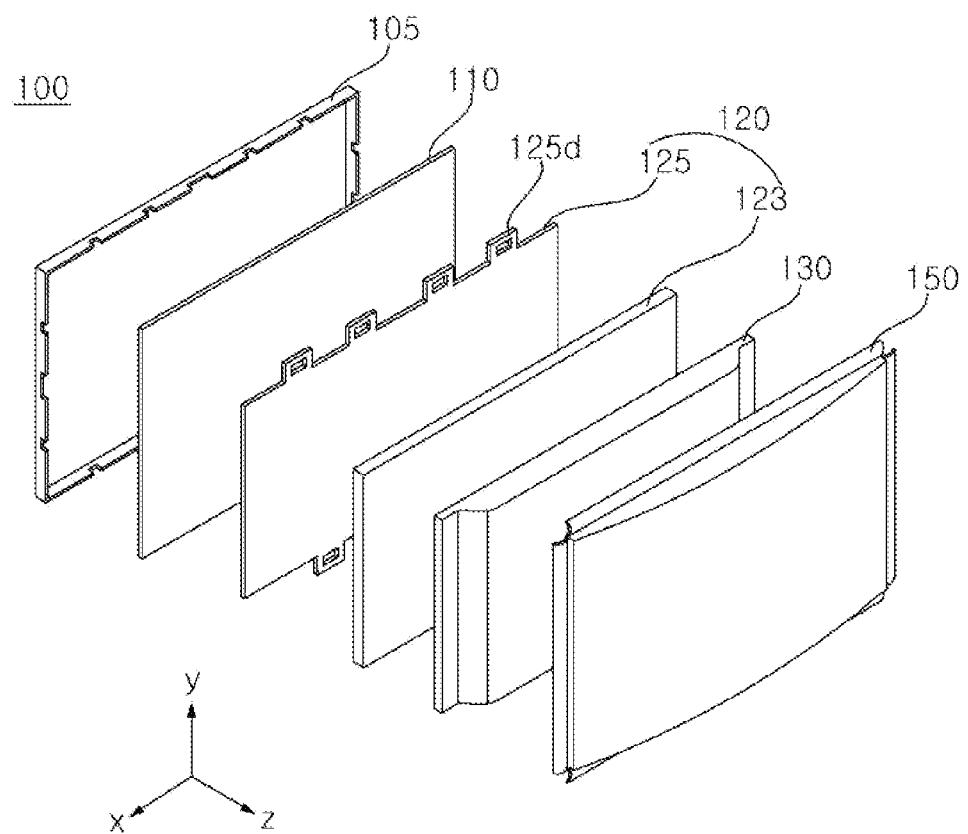

[Figure 3]
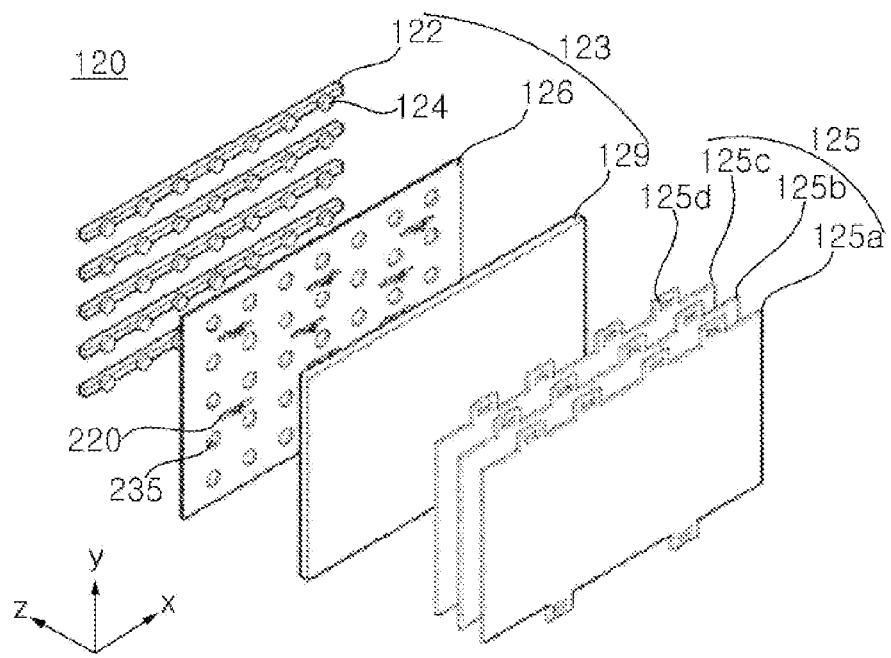

[Figure 4]
222
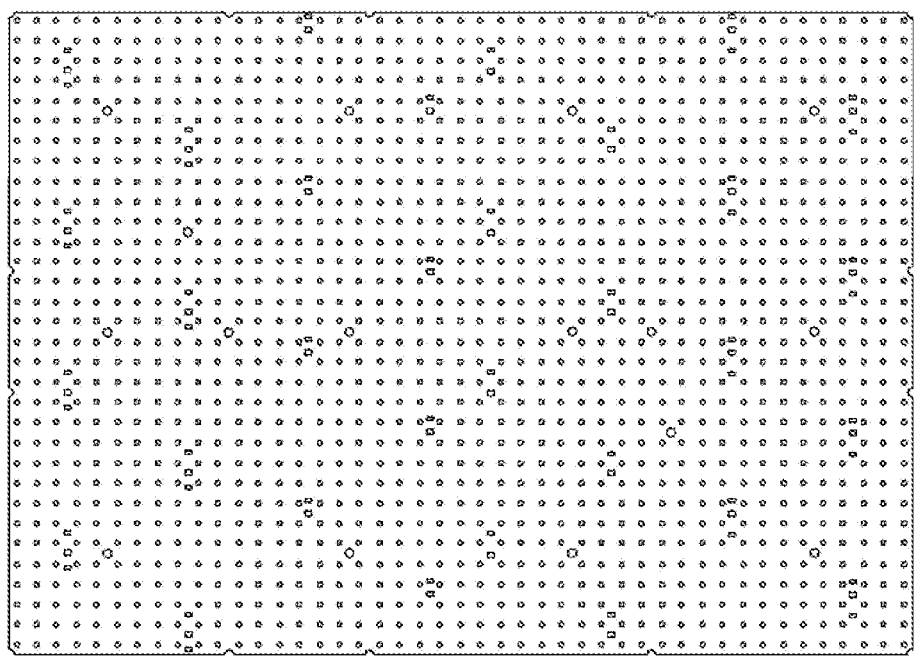

[Figure 5]
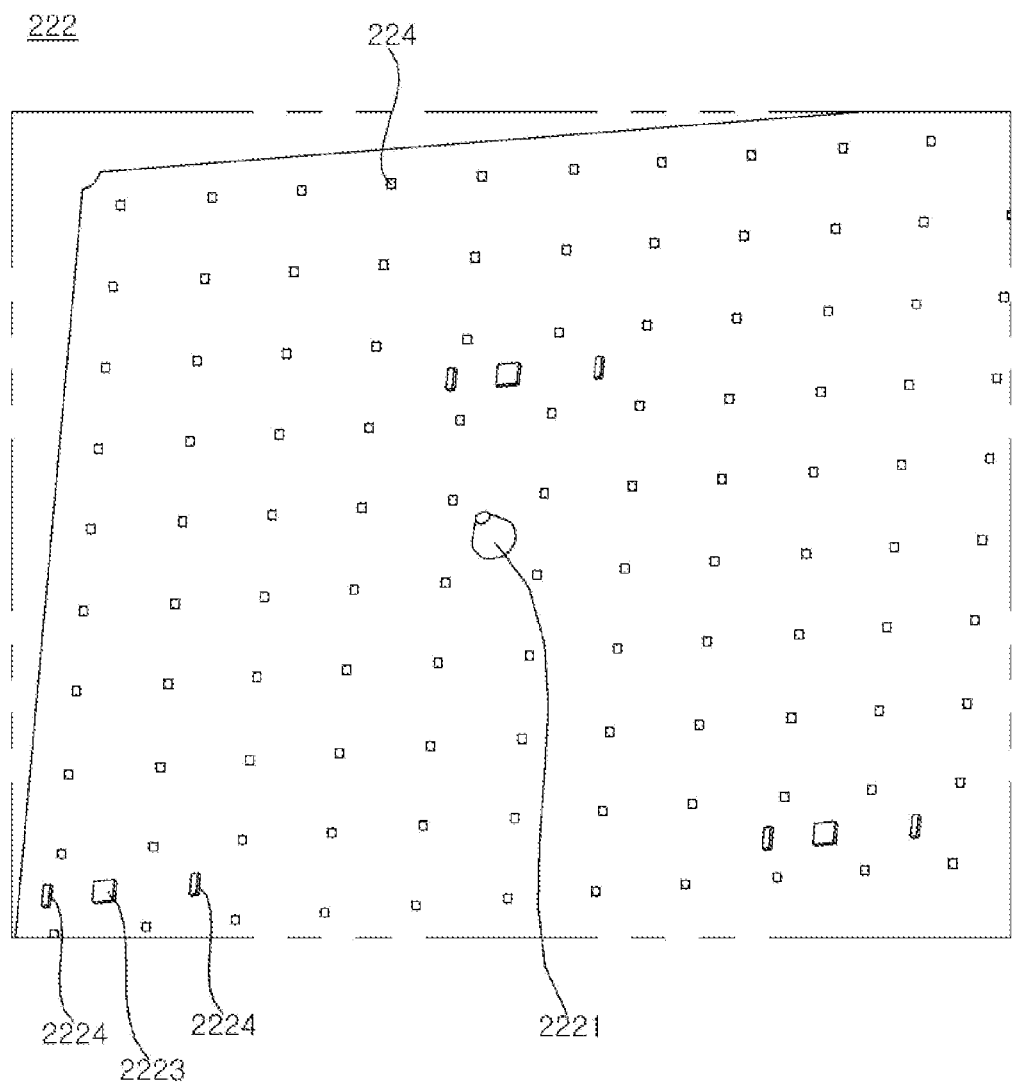

[Figure 6]
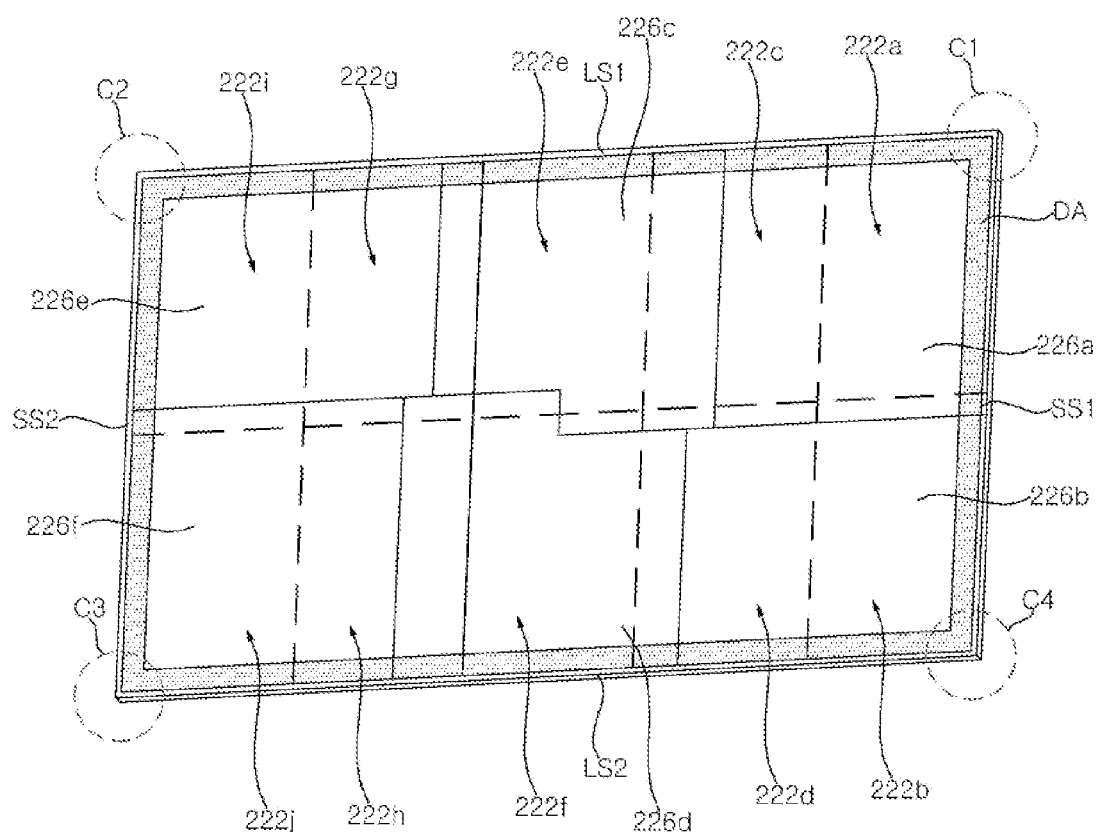

[Figure 7]
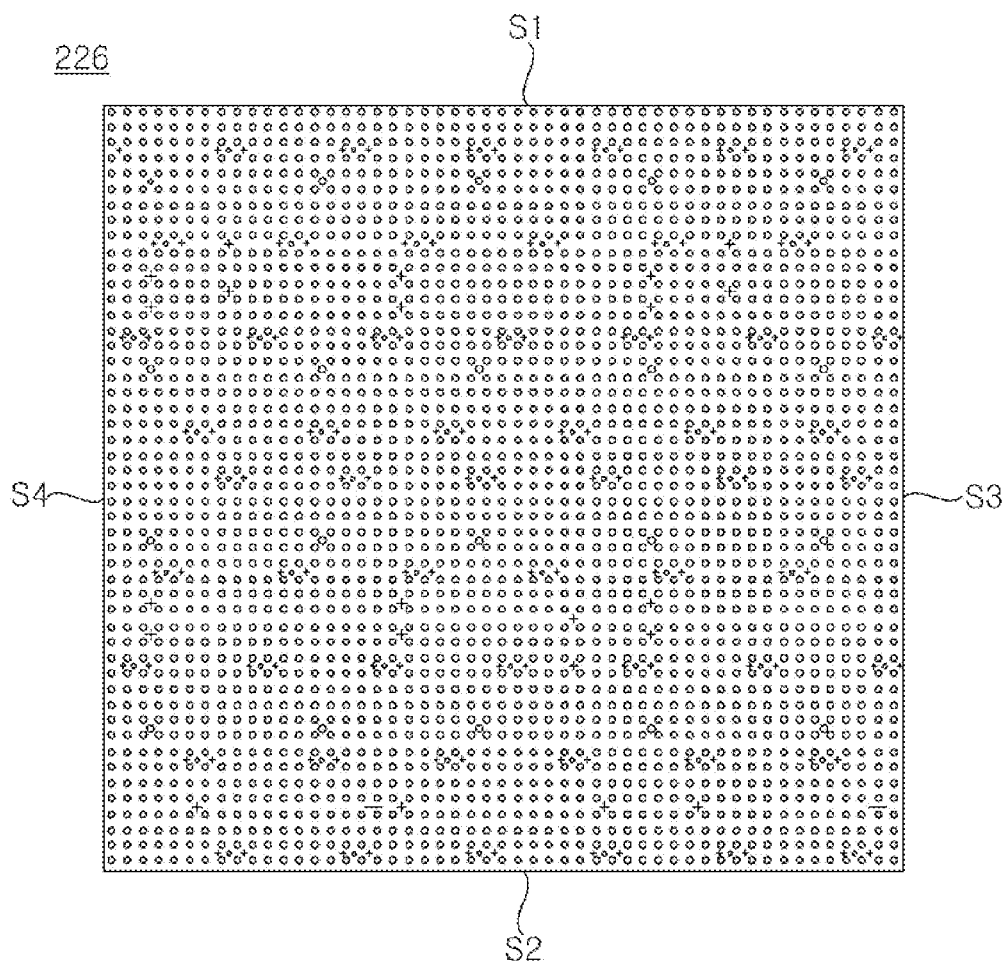

【Figure 8】
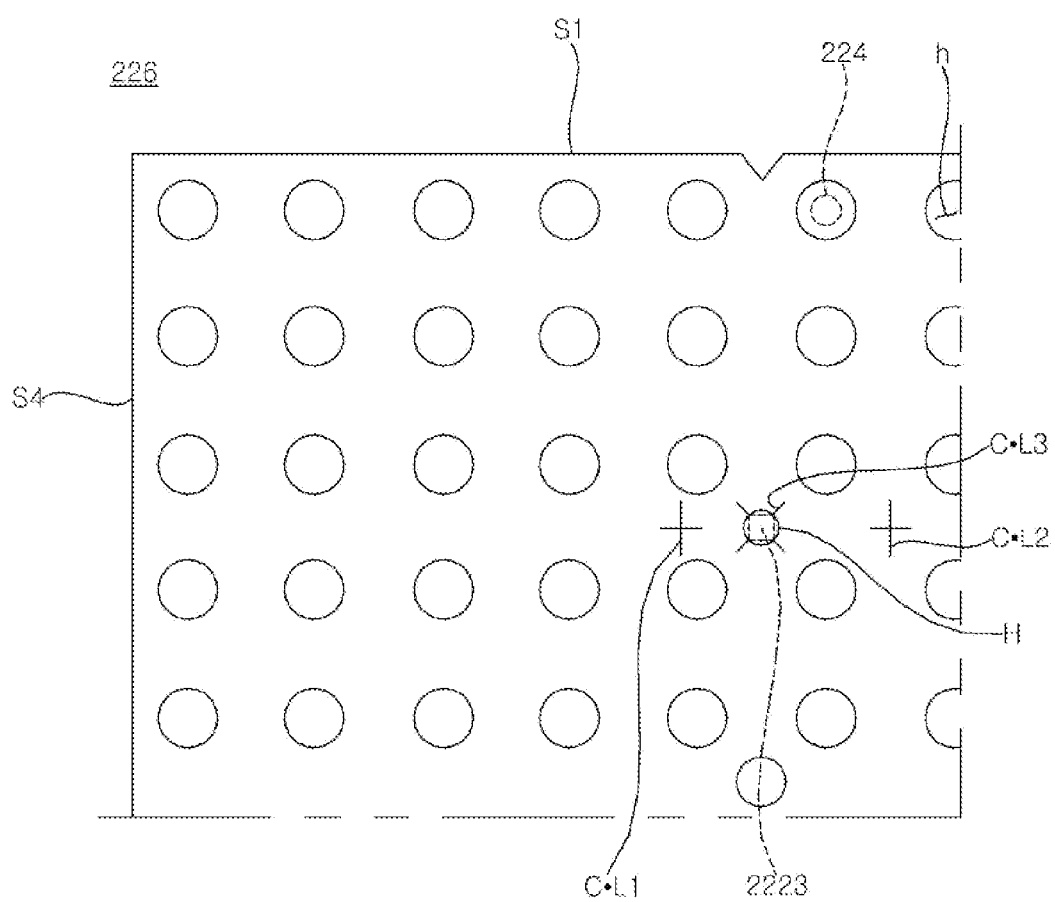

[Figure 9]
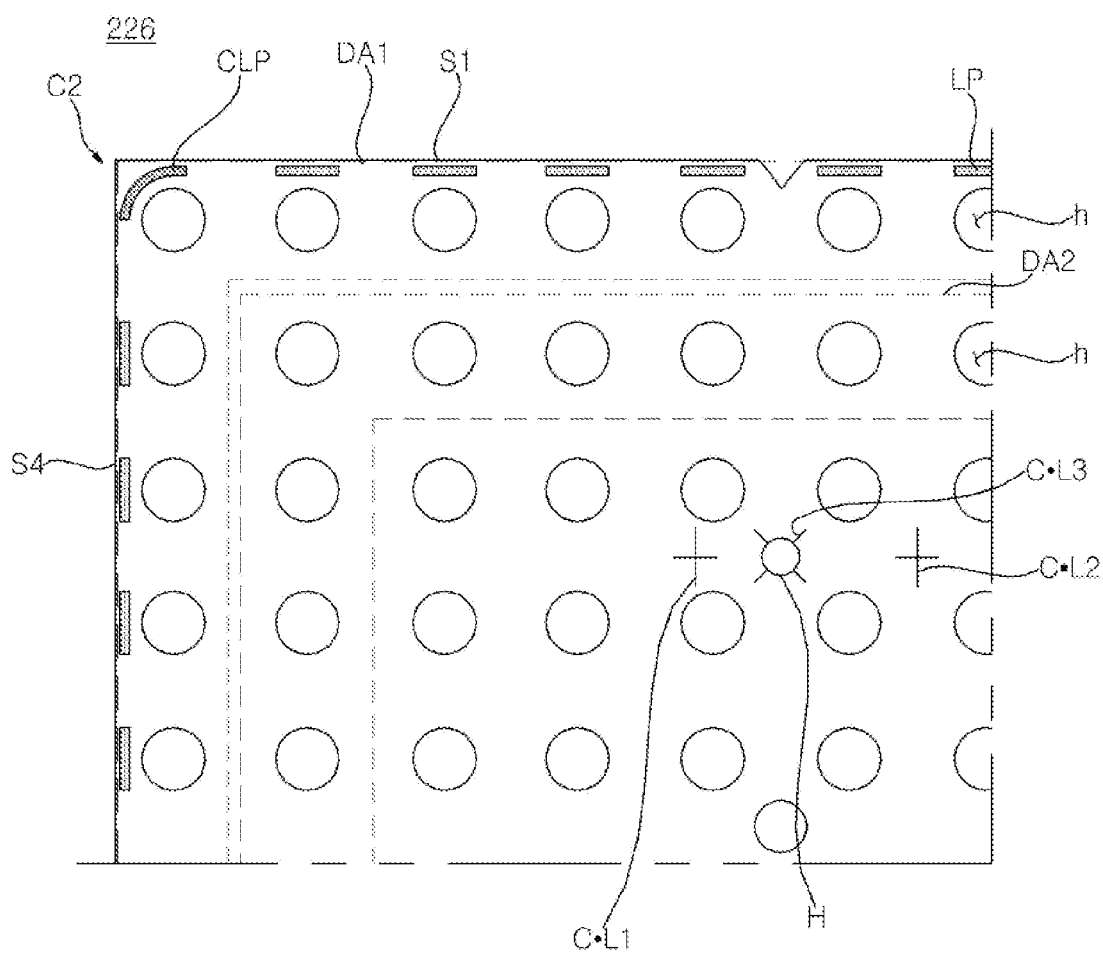

[Figure 10]
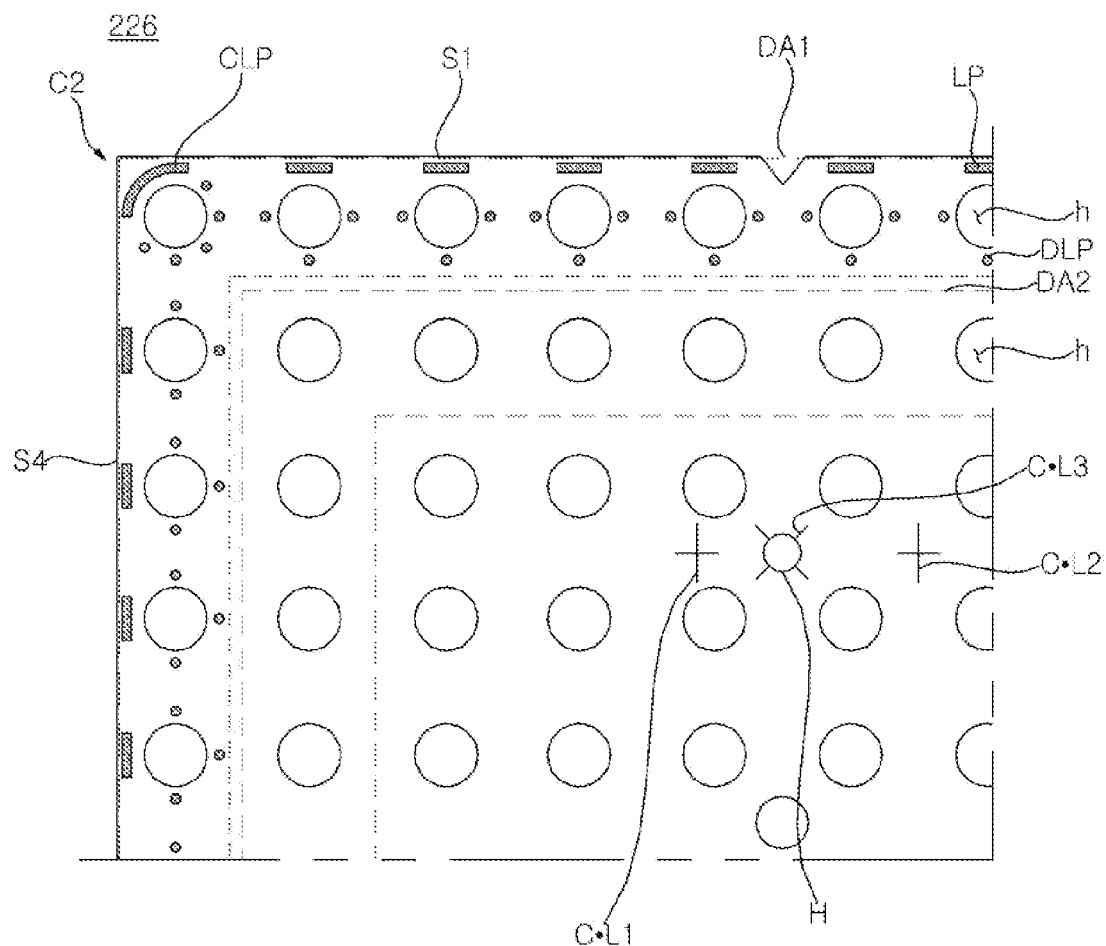

【Figure 11】
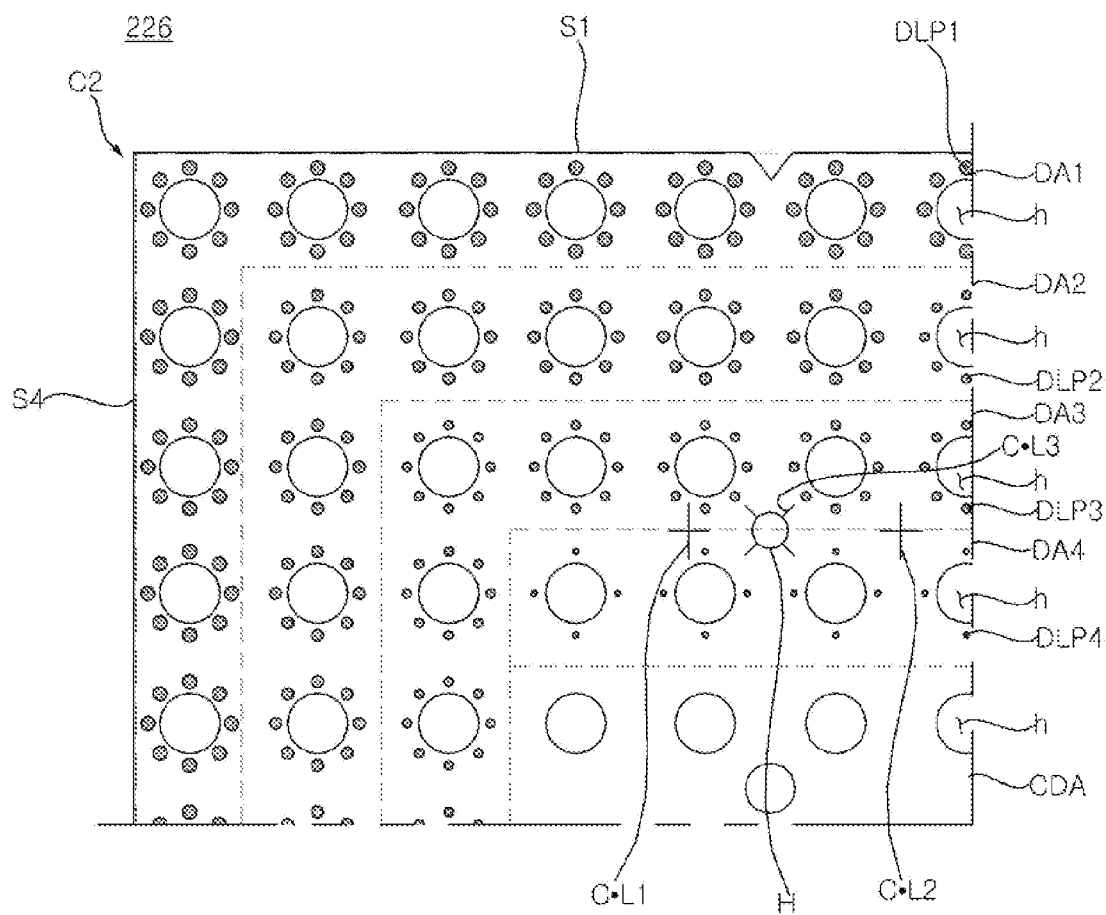

【Figure 12】
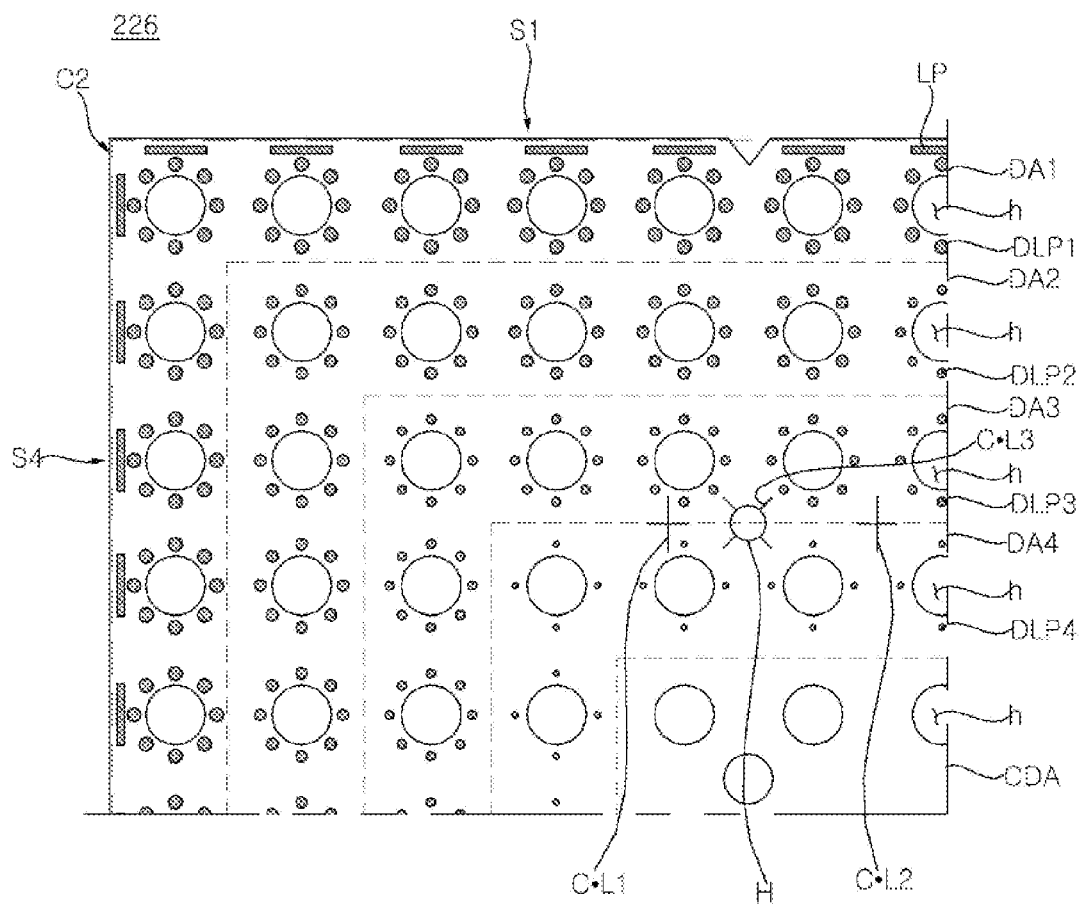

【Figure 13】
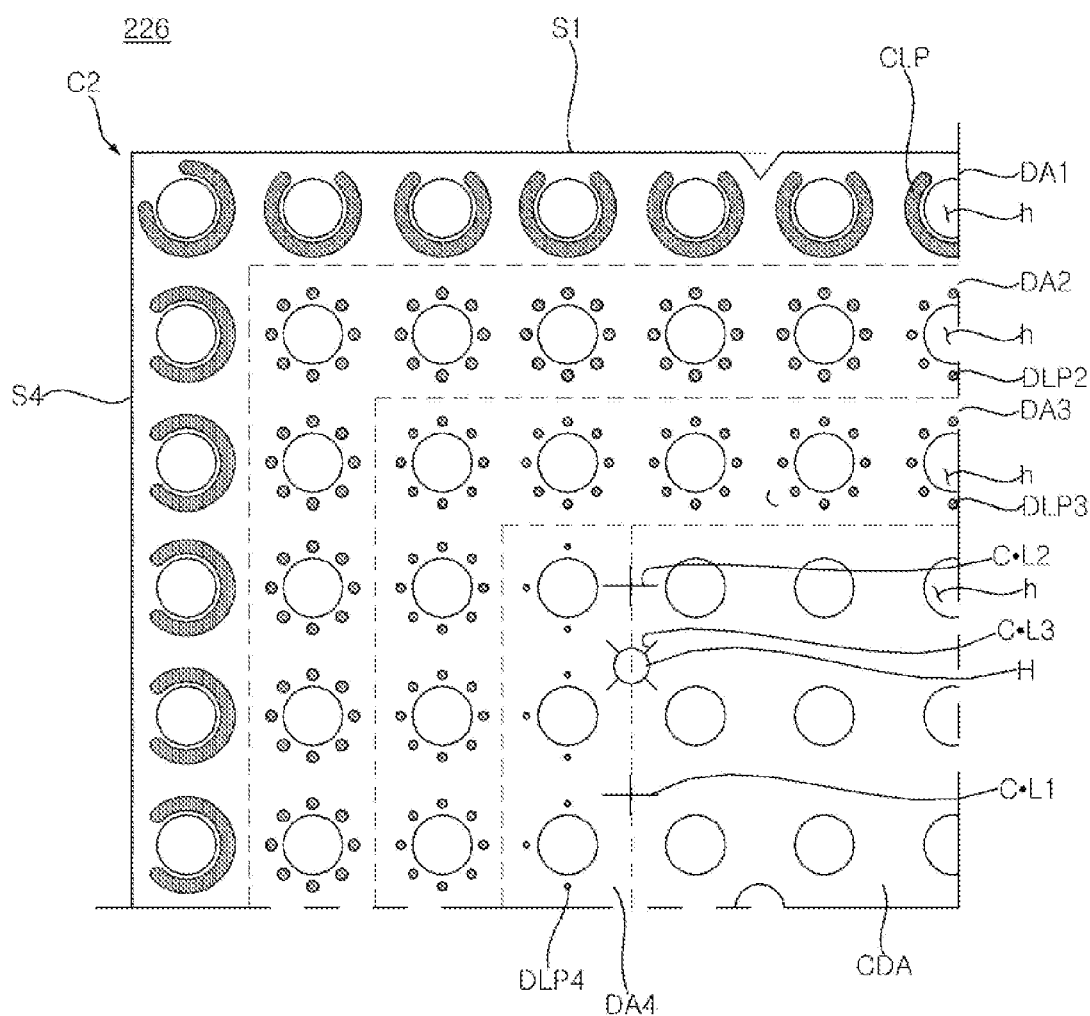

[Figure 14]
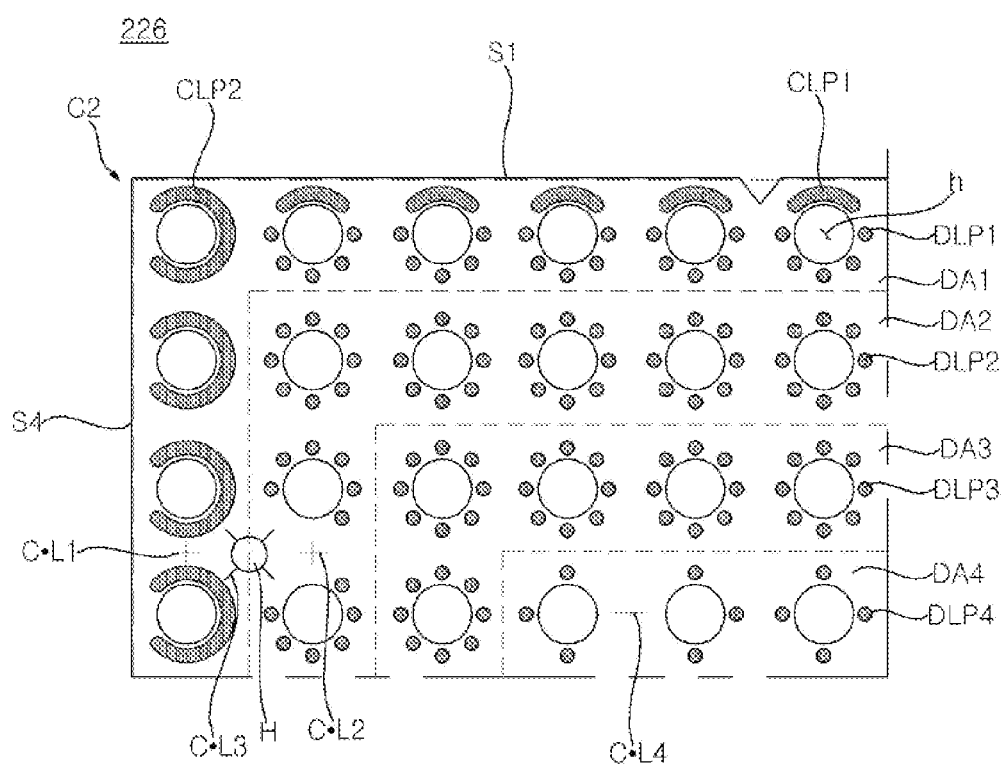

[Figure 15]
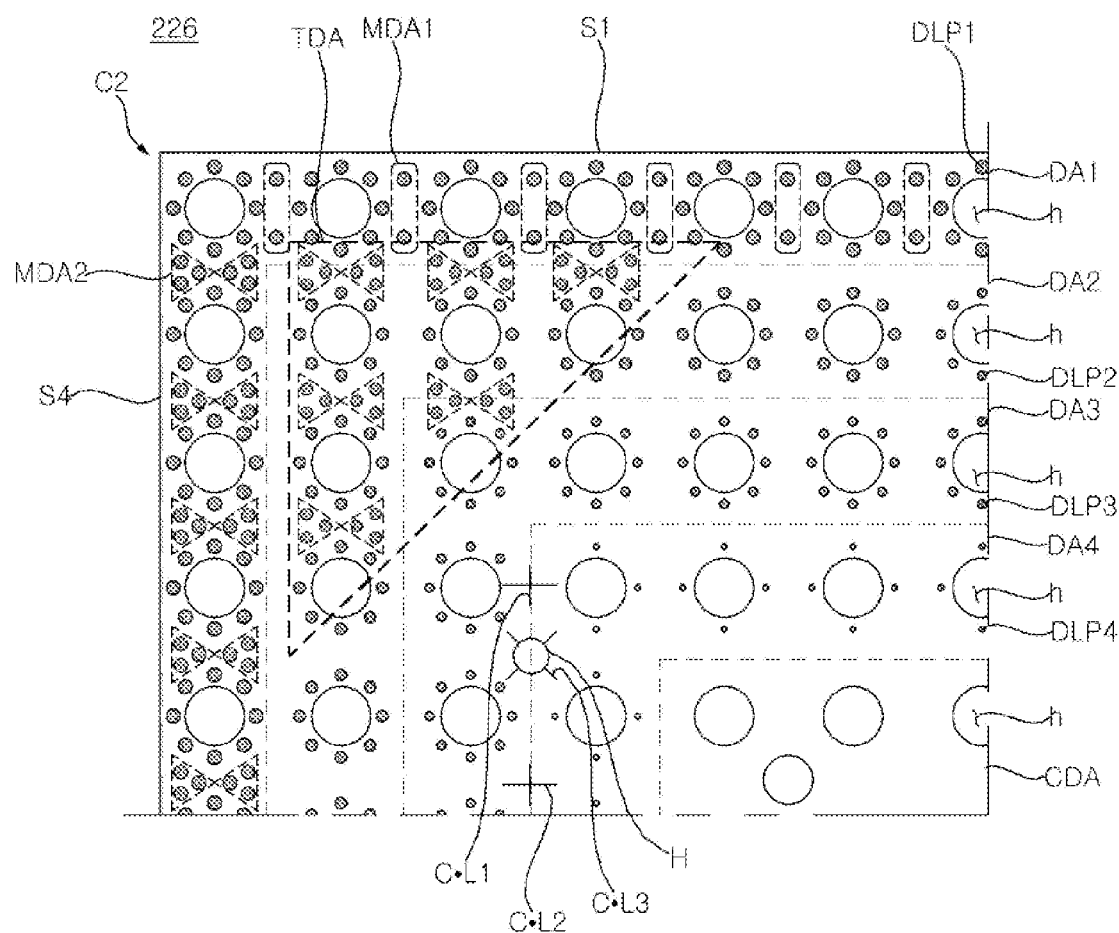

[Figure 16]
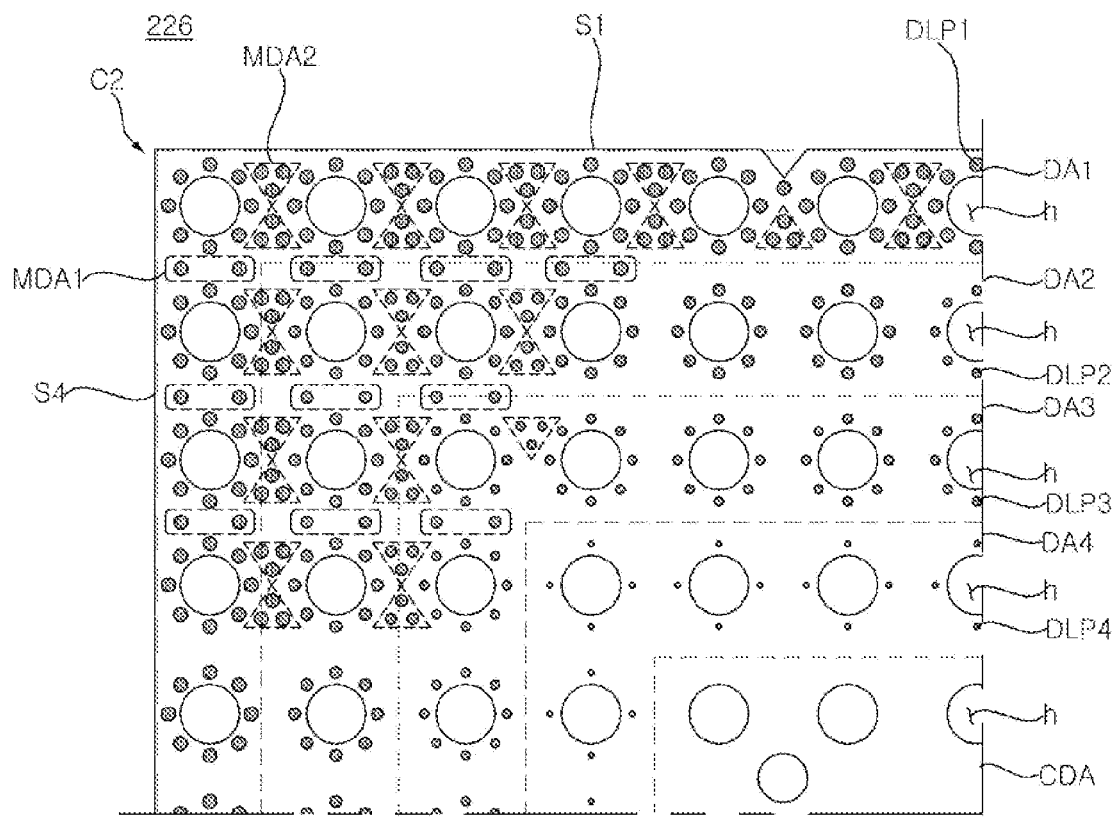

DISPLAY DEVICE WITH REFLECTIVE SHEET HAVING COLOR CONVERTING LIGHT PATTERNS

CROSS-REFERENCE TO RELATED APPLICATIONS

This application is the National Stage filing under 35 U.S.C. 371 of International Application No. PCT/KR2022/002262, filed on Feb. 16, 2022, which claims the benefit of earlier filing date and right of priority to Korean Application No. 10-2021-0066019, filed on May 24, 2021, the contents of which are all hereby incorporated by reference herein their entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Organic Light Emitting Diode (OLED), and Micro LED have been researched and used in recent years.

Among them, the liquid crystal panel of the LCD includes a liquid crystal layer, and a TFT substrate and a color filter substrate facing each other with the liquid crystal layer interposed therebetween, and may display an image by using light provided from a backlight unit.

Recently, as interest in the image quality of display device increases, color expression or color reproducibility close to true color is receiving peculiar attention, and a lot of researches have been achieved on image quality improvement to improve light uniformity and to realize natural colors.

DISCLOSURE OF INVENTION

Technical Problem

An object of the present disclosure is to solve the above and other problems. Another object of the present disclosure is to provide a display device capable of improving image quality.

Another object of the present disclosure is to provide a display device capable of improving luminance and light uniformity of a backlight unit.

Another object of the present disclosure is to provide a display device capable of effectively controlling light provided from a backlight unit.

Another object of the present disclosure is to improve the purity of white light by improving the bluish phenomenon of light provided from a backlight unit.

Solution to Problem

In accordance with an aspect of the present disclosure, a display device includes: a display panel; a frame which is positioned in a rearward direction of the display panel, and to which the display panel is coupled; a substrate configured to be positioned between the display panel and the frame, and fixed to the frame; a plurality of light sources configured to be mounted on the substrate to form a row and a column; a reflective sheet configured to be positioned on the substrate, and to have a plurality of holes through which each of the plurality of light sources passes; and a light pattern configured to be formed on the reflective sheet, and to convert a color of a light provided by the plurality of light sources, wherein the reflective sheet includes: a first hole positioned adjacent to an edge of the reflective sheet; a second hole configured to be positioned adjacent to the first hole and positioned farther than the first hole from the edge of the reflective sheet; a first area positioned around the first hole; and a second area positioned around the second hole, wherein the light pattern includes: a first light pattern positioned in the first area; and a second light pattern positioned in the second area, wherein an area of the first light pattern is larger than an area of the second light pattern.

Advantageous Effects of Invention

The effect of the display device according to the present disclosure is as follows.

According to at least one of the embodiments of the present disclosure, image quality of a display device can be improved.

According to at least one of the embodiments of the present disclosure, it is possible to provide a display device capable of improving luminance and light uniformity of the backlight unit.

According to at least one of the embodiments of the present disclosure, it is possible to provide a display device capable of effectively controlling light provided from the backlight unit.

According to at least one of the embodiments of the present disclosure, the purity of white light can be improved by improving the bluish phenomenon of light provided from the backlight unit.

BRIEF DESCRIPTION OF DRAWINGS

The above and other objects, features and advantages of the present disclosure will be more apparent from the following detailed description in conjunction with the accompanying drawings, in which:

FIGS. 1 to 3 are diagrams illustrating examples of a display device according to embodiments of the present disclosure;

FIGS. 4 to 6 are diagrams illustrating examples of a substrate and a optical assembly for providing light to a display device according to embodiments of the present disclosure; and FIGS. 7 to 16 are diagrams illustrating examples of a reflective sheet according to embodiments of the present disclosure.

MODE FOR INVENTION

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings.

In addition, in describing the embodiments disclosed in the present specification, if it is determined that detailed descriptions of related known technologies may obscure the gist of the embodiments disclosed in the present specification, the detailed description thereof will be omitted.

In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Hereinafter, a liquid crystal display device (LCD) will be described as an example for a display panel, but the display panel applicable to the present disclosure is not limited to the liquid crystal display device.

Referring to FIG. 1, a display device may include a first long side LS1, a second long side LS2 opposite to the first long side LS1, a first short side SS1 adjacent to the first long side LS1 and the second long side LS2, and a second short side SS2 opposite to the first short side SS1.

The first short side area SS1 may be referred to as a first side area, the second short side area SS2 may be referred to as a second side area opposite to the first side area, the first long side area LS1 may be referred to as a third side area which is adjacent to the first side area and the second side area, and positioned between the first side area and the second side area, and the second long side area LS2 may be referred to as a fourth side area which is adjacent to the first side area and the second side area, positioned between the first side area and the second side area, and opposite to the third side area.

It is illustrated and described that the lengths of the first and second long sides LS1 and LS2 are longer than the lengths of the first and second short sides SS1 and SS2. However, it may be possible that the lengths of the first and second long sides LS1 and LS2 are approximately equal to the lengths of the first and second short sides SS1 and SS2.

A first direction DR1 may be a direction parallel to the long side LS1, LS2 of a display panel 100, and a second direction DR2 may be a direction parallel to the short side SS1, SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side on which the display device displays an image may be referred to as a forward direction or a front side or front surface. When the display device displays an image, the side from which the image cannot be observed may be referred to as a rearward direction, or a rear side or rear surface.

When the display is viewed from the forward direction or the front side, the side of the first long side LS1 may be referred to as an upper side or an upper surface. Similarly, the side of the second long side LS2 may be referred to as a lower side or a lower surface. Similarly, the side of the first short side SS1 may be referred to as a right side or a right surface, and the side of the second short side SS2 may be referred to as a left side or a left surface.

The first long side LS1, the second long side LS2, the first short side SS1, and the second short side SS2 may be referred to as an edge of the display device. In addition, a point where the first long side LS1, the second long side LS2, the first short side SS1, and the second short side SS2 meet each other may be referred to as a corner. For example, a point where the first long side LS1 and the first short side SS1 meet may be a first corner C1, a point where the first long side LS1 and the second short side SS2 meet may be a second corner C2, a point where the second short side SS2 and the second long side LS2 meet may be a third corner C3, and a point where the second long side LS2 and the first short side SS1 meet may be a fourth corner C4.

A direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Referring to FIG. 2, a front cover 105 may cover at least partial area of the front and side surfaces of a display panel 110. The front cover 105 may be divided into a front cover positioned in the front surface of the display panel 110 and a side cover positioned in the side surface of the display panel 110. Either one of the front cover and the side cover may be omitted.

The display panel 110 is provided on the front surface of the display device 100 and may display an image. The display panel 110 may display an image in such a manner that a plurality of pixels output red, green, or blue (RGB) for each pixel according to the timing. The display panel 110 may be divided into an active area on which an image is displayed and a de-active area on which an image is not displayed. The display panel 110 may include a front substrate and a rear substrate facing each other with a liquid crystal layer interposed therebetween.

The front substrate may include a plurality of pixels including red (R), green (G), and blue (B) sub-pixels. The front substrate may output light corresponding to a color of red, green, or blue according to a control signal.

The rear substrate may include switching elements. The rear substrate may switch a pixel electrode. For example, the pixel electrode may change the molecular arrangement of the liquid crystal layer according to a control signal applied from an external. The liquid crystal layer may include liquid crystal molecules. The liquid crystal molecules may change their arrangement in response to a voltage difference generated between the pixel electrode and a common electrode. The liquid crystal layer may transmit or block light provided from a backlight unit 120 to the front substrate.

The backlight unit 120 may be positioned in the rearward direction of the display panel 110. The backlight unit 120 may include light sources. The backlight unit 120 may be coupled to a frame 130 in the forward direction of the frame 130.

The backlight unit 120 may be driven by a full driving method or a partial driving method such as local dimming or impulsive. The backlight unit 120 may include an optical sheet 125 and an optical layer 123. The optical layer 123 may be referred to as an optical module 123 or an optical unit 123.

The optical sheet 125 may allow the light of the light source to be evenly transmitted to the display panel 110. The optical sheet 125 may include a plurality of layers. For example, the optical sheet 125 may include a prism sheet, a diffusion sheet, or the like.

The optical sheet 125 may include a coupling portion 125d. The coupling portion 125d may be coupled to the front cover 105, the frame 130, and/or a back cover 150. Alternatively, the coupling portion 125d may be fastened to a structure formed or coupled on the front cover 105, the frame 130, and/or the back cover 150.

The frame 130 may serve to support components of the display device 100. For example, a configuration such as the backlight unit 120 may be coupled to the frame 130. The frame 130 may be made of a metal material such as an aluminum alloy.

The back cover 150 may be positioned in the rear side or in the rearward direction of the display device 100. The back cover 150 may be coupled to the frame 130 and/or the front cover 105. For example, the back cover 150 may be an injection made of a resin material.

Referring to FIG. 3, the substrate 122 may be configured in the form of a plurality of straps which extend in a first direction and are spaced apart from each other by a certain distance in a second direction orthogonal to the first direction.

At least one optical assembly 124 may be mounted on the substrate 122. An electrode pattern for connecting an adapter and the optical assembly 124 may be formed on the substrate 122. For example, a carbon nanotube electrode pattern for connecting the optical assembly 124 and the adapter may be formed on the substrate 122.

The substrate 122 may be formed of at least one of polyethylene terephthalate (PET), glass, poly carbonate (PC), and silicon. The substrate 122 may be a printed circuit board (PCB) on which at least one optical assembly 124 is mounted.

The optical assembly 124 may be disposed on the substrate 122 with a certain interval in the first direction. A diameter of the optical assembly 124 may be greater than a width of the substrate 122. That is, it means that it is greater than the length of the second direction of the substrate 122.

The optical assembly 124 may be a light emitting diode (LED) chip or a light emitting diode package including at least one light emitting diode chip.

The optical assembly 124 may include a light source. The light source may be a colored LED or a white LED that emits at least one color among colors such as red, blue, green, and the like. The colored LED may be a blue LED. For example, the light source may be a mini LED.

A reflective sheet 126 may be positioned in the front side of the substrate 122. The reflective sheet 126 may be positioned on an area of *?*the substrate 122 excluding the area where the optical assembly 124 is formed. The reflective sheet 126 may have a plurality of holes 235.

The reflective sheet 126 may reflect the light emitted from the optical assembly 124 toward the front side. In addition, the reflective sheet 126 may recycle light emitted from the optical assembly 124.

The reflective sheet 126 may include at least one of metal and metal oxide which are reflective materials. For example, the reflective sheet 126 may include a metal having a high reflectance such as at least one of aluminum (Al), silver (Ag), gold (Au), and titanium dioxide (TiO2) and/or a metal oxide.

A resin may be deposited or coated on the optical assembly 124 and/or the reflective sheet 126. The resin may serve to diffuse light emitted from the optical assembly 124.

An optical layer 129 may include a phosphor. The optical layer 129 may be formed of a plate or a thin sheet. The optical layer 129 may include a red-based phosphor and/or a green-based phosphor. The optical layer 129 may change a wavelength or color of light provided from the optical assembly 124. For example, when the optical assembly 124 provides blue-based light, the optical layer 129 may convert the blue-based light to white light. The optical layer 129 may be referred to as a QD layer or a QD sheet.

The optical sheet 125 may be positioned in the forward direction of the optical layer 129. The rear surface of the optical sheet 125 may be in close contact with the optical layer 129, and the front surface of the optical sheet 125 may be in close contact with or adjacent to the rear surface of the display panel 110.

The optical sheet 125 may include at least one sheet. Specifically, the optical sheet 125 may include one or more prism sheets and/or one or more diffusion sheets. The plurality of sheets included in the optical sheet 125 may be in an adhesive state and/or a close contact state.

The optical sheet 125 may be configured of a plurality of sheets having different functions. For example, the optical sheet 125 may include first to third optical sheets 125a to 125c. For example, the first optical sheet 125a may be a diffusion sheet, and the second and third optical sheets 125b and 125c may be a prism sheet. The number and/or positions of the diffusion sheet 125a and the prism sheets 125b and 125c may be changed.

The diffusion sheet 125a may prevent the light emitted from the optical layer 129 from being partially concentrated, thereby making light distribution more uniform. The prism sheets 125b and 125c may collect light emitted from the diffusion sheet 125a to provide light to the display panel 110.

The coupling portion 125d may be formed in at least one of sides or edges of the optical sheet 125. The coupling portion 125d may be formed in at least one of the first to third optical sheets 125a to 125c.

The coupling portion 125d may be formed in the long side of the optical sheet 125. The coupling portion 125d formed in the first long side and the coupling portion 125d formed in the second long side may be asymmetric. For example, the positions and/or the number of the coupling portion 125d in the first long side and the coupling portion 125d in the second long side may be different from each other.

Referring to FIGS. 4 and 5, a substrate 222 may be a plate. The front surface of the substrate 222 may be white. A white or reflective material may be applied to the front surface of the substrate 222. The optical assembly 224 may be mounted on the substrate 222. The optical assembly 224 may include a light source and a mini-lens. For example, the light source may be a mini LED that provides blue-based light. A plurality of light sources may be mounted on the substrate 222. The plurality of light sources may be disposed to form a plurality of rows and a plurality of columns.

An integrated device 2223 and a capacitor 2224 may be disposed around the light source 224. For example, the integrated device 2223 may be an IC chip 2223. The plurality of capacitors 2224 may face the integrated device 2223. The integrated device 2223 may control power provided to a certain number of the plurality of light sources 224.

A supporter 2221 may be mounted on the substrate 222. The supporter 2221 may maintain a constant distance between the substrate 222 and the aforementioned optical layer 129. The supporter 2221 may have a conical shape as a whole. The supporter 2221 may be formed by double injection and may be bonded to the substrate 222. The supporter 2221 may be positioned between the optical assemblies 224, and may be fixed on the substrate 222.

Referring to FIG. 6, there may be a plurality of substrates 222. The plurality of substrates 222 may include a first substrate 222a, a second substrate 222b, a third substrate 222c, a fourth substrate 222d, a fifth substrate 222e, a sixth substrate 222f, a seventh substrate 222g, an eighth substrate 222h, a ninth substrate 222i, and a tenth substrate 222j.

The first substrate 222a may be positioned in contact with the first long side LS1 and the first short side SS1, and may form a first corner C1. The second substrate 222b may be positioned in contact with the first short side SS1 and the second long side LS2, and may form a fourth corner C4. The second substrate 222b may be adjacent to the first substrate 222a in the up-down direction.

The ninth substrate 222i may be positioned in contact with the first long side LS1 and the second short side SS2, and may form a second corner C2. The tenth substrate 222j may be positioned in contact with the second short side SS2 and the second long side LS2, and may form a third corner C3. The tenth substrate 222j may be adjacent to the ninth substrate 222i in the up-down direction.

The fifth substrate 222e may be in contact with the first long side LS1 and may be positioned between the first substrate 222a and the ninth substrate 222i. The sixth substrate 222f may be in contact with the second long side LS2 and may be positioned between the second substrate 222d and the tenth substrate 222j. The sixth substrate 222f may be adjacent to the fifth substrate 222e in the up-down direction.

The third substrate 222c may be in contact with the first long side LS1 and may be positioned between the first substrate 222a and the fifth substrate 222e. The fourth substrate 222d may be in contact with the second long side LS2 and may be positioned between the second substrate 222b and the sixth substrate 222f. The fourth substrate 222d may be adjacent to the third substrate 222c in the up-down direction.

The seventh substrate 222g may be in contact with the first long side LS1 and may be positioned between the fifth substrate 222e and the ninth substrate 222i. The eighth substrate 222h may be in contact with the second long side LS2 and may be positioned between the sixth substrate 222f and the tenth substrate 222j. The eighth substrate 222h may be adjacent to the seventh substrate 222g in the up-down direction.

The reflective sheet 226 may cover the substrate 222. There may be a plurality of reflective sheets 226. The plurality of reflective sheets 226 may cover the plurality of substrates 222. The plurality of reflective sheets 226 may include a first reflective sheet 226a, a second reflective sheet 226b, a third reflective sheet 226c, a fourth reflective sheet 226d, a fifth reflective sheet 226e, and a sixth reflective sheet 226f.

The first reflective sheet 226a may cover the first substrate 222a. The first reflective sheet 226a may overlap the second substrate 222b, the third substrate 222c, and the fourth substrate 222d. The second reflective sheet 226b may cover at least a part or most of the second substrate 222b, and may overlap the fourth substrate 222d.

The third reflective sheet 226c may cover at least a part or most of the fifth substrate 222e. The third reflective sheet 226c may overlap the third substrate 222c, the fourth substrate 222d, the sixth substrate 222f, and the seventh substrate 222g. The fourth reflective sheet 226d may cover at least a part or most of the sixth substrate 222f. The fourth reflective sheet 226d may overlap the fourth substrate 222d, the fifth substrate 222e, the sixth substrate 222f, and the seventh substrate 222g.

The fifth reflective sheet 226e may cover at least a part or most of the ninth substrate 222i, and may overlap the seventh substrate 222g. The sixth reflective sheet 226f may cover the tenth substrate 222j. The sixth reflective sheet 226f may overlap the seventh substrate 222g, the eighth substrate 222h, and the ninth substrate 222i.

An area DA or a dot area DA or a pattern area DA may be formed along the first long side LS1, the second long side LS2, the first short side SS1, and/or the second short side SS2.

Referring to FIGS. 7 and 8, the reflective sheet 226 may include a first side S1, a second side S2, a third side S3, and a fourth side S4. A side S may be referred to as an edge S.

The reflective sheet 226 may include a plurality of holes (h) and a plurality of cut-lines (CL). The plurality of holes h may be formed to correspond to the light sources 224 or the optical assemblies 224. An area of *?*the hole h may be greater than a cross-sectional area of *?*the optical assembly 224.

The reflective sheet 226 may have an accommodation hole H. A cut-line CL3 may be formed around the accommodation hole H. The cut line CL3 may be formed in the radial direction of the accommodation hole H. For example, the cut line CL3 may have a + shape. The accommodation hole H may be referred to as a cut-line hole H. The integrated device 2223 may be positioned in the accommodation hole H. The area of the accommodation hole H may be larger than the cross-sectional area of the integrated device 2223. For example, the accommodation hole H may have a circular shape, and the integrated device 2223 may have a rectangular shape. A portion of the integrated device 2223 may overlap the accommodation hole H, and the cut line CL3 around the accommodation hole H may be opened.

The reflective sheet 226 may include a cut line CL. For example, the cut line CL may have a + shape. The cut line CL1, CL2 may be positioned between the holes h, and may be positioned adjacent to the accommodation hole H. A first cut line CL1 may be positioned between the holes h, and may be positioned adjacent to the accommodation hole H. A second cut line CL2 may face the first cut line CL1 with respect to the accommodation hole H. The accommodation hole H may be positioned between the first cut line CL1 and the second cut line CL2. The capacitors 2224 (see FIG. 5) adjacent to the integrated device 2223 may be positioned below the cut lines CL1 and CL2, and the cut lines CL1 and CL2 may be opened.

Accordingly, it is possible to prevent the reflective sheet 226 from being spaced apart from the substrate 222, and to improve light uniformity.

Referring to FIG. 9, the reflective sheet 226 may include a first area DA1 and a second area DA2. The first area DA1 may be referred to as a first dot area DA1 or a first pattern area DAL, and the second area DA2 may be referred to as a second dot area DA2 or a second pattern area DA2.

The first area DA1 may be formed to be elongated along the first side S1 and/or the fourth side S4. The first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3.

The second area DA2 may be formed to be elongated along the first side S1 and/or the fourth side S4. The second plurality of holes h may be sequentially formed in the second area DA2 while maintaining a constant interval. The second area DA2 may be in contact with or adjacent to the first area DA1. The distance of the second area DA2 from the first side S1 and/or the second side S2 is greater than the distance of the first area DA1 from the first side S1 and/or the fourth side S4. The first area DA1 may be positioned between the second area DA2 and the first side ST and/or the fourth side S4.

The light pattern LP, CLP may include a phosphor. The light pattern LP, CLP may include a red-based phosphor and a green-based phosphor. The light pattern LP, CLP may include a yellow-based phosphor.

For example, the light pattern LP, CLP may have a yellow-based color, with the naked eye. The light pattern LP, CLP may convert blue-based light provided by the light source 224 (refer to FIG. 5) or the optical assembly 224 into white light.

For another example, the light pattern LP, CLP may have black or gray-based color, with the naked eye. The light pattern LP, CLP may absorb light provided by the light source 224 (refer to FIG. 5) or the optical assembly 224.

The light pattern LP, CLP may be formed in the first area DA1. The light pattern LP, CLP may be formed between the plurality of first holes h and the first side ST and/or the fourth side S4. The light pattern LP, CLP may include a plurality of segments LP and CLP. The plurality of segments LP may be an elongated line. Each of the plurality of lines LP may be positioned to correspond to each of the plurality of holes h. For example, the length of the line LP may correspond to the diameter of the hole h. As another example, the length of the line LP may be smaller than the diameter of the hole h. As another example, the length of the line LP may be greater than the diameter of the hole h.

The corner line CLP may extend while being bent or may have a fan shape or semicircular shape. For example, the corner line CLP may be a quarter circle. The corner line CLP may be positioned between the hole h closest to the second corner C2 and the second corner C2. The description of the second corner C2 may be applied to other corners CT, C3, C4.

Referring to FIG. 10, the reflective sheet 226 may include a first area DA1 and a second area DA2. The first area DA1 may be referred to as a first dot area DA1 or a first pattern area DA1, and the second area DA2 may be referred to as a second dot area DA2 or a second pattern area DA2.

The first area DA1 may be formed to be elongated along the first side S1 and/or the fourth side S4. A first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3.

The second area DA2 may be formed to be elongated along the first side S1 and/or the fourth side S4. A second plurality of holes h may be sequentially formed in the second area DA2 while maintaining a constant interval. The second area DA2 may be in contact with or adjacent to the first area DA1. The distance of the second area DA2 from the first side S1 and/or the fourth side S4 may be greater than the distance of the first area DA1 from the first side S1 and/or the fourth side S4. The first area DA1 may be positioned between the second area DA2 and the first side S1 and/or the fourth side S4.

The light pattern LP, CLP, DLP may include a phosphor. The light pattern LP, CLP, DLP may include a red-based phosphor and a green-based phosphor. The light pattern LP, CLP, DLP may include a yellow-based phosphor.

For example, with the naked eye, the light pattern LP, CLP, DLP may have a yellow-based color. The light pattern LP, CLP, DLP may convert blue-based light provided by the light source 224 (refer to FIG. 5) or the optical assembly 224 to white light.

For another example, the light pattern LP, CLP, DLP may have black or gray-based color, with the naked eye. The light pattern LP, CLP, DLP may absorb light provided by the light source 224 (refer to FIG. 5) or the optical assembly 224.

The light pattern LP, CLP, DLP may be formed in the first area DA1. The light pattern LP, CLP may be formed between the first plurality of holes h and the first side S1 and/or the fourth side S4.

The light pattern LP may include a plurality of segments LP. The plurality of segments LP may be an elongated line. Each of the plurality of lines LP may be positioned to correspond to each of the plurality of holes h. For example, the length of the line LP may correspond to the diameter of the hole h. As another example, the length of the line LP may be smaller than the diameter of the hole h. As another example, the length of the line LP may be greater than the diameter of the hole h.

The light pattern DLP may include dots DLP. The dots DLP may be disposed around the hole h. For example, the number of dots DLP may be three. The line LP and the dot DLP may be disposed to surround the hole h. Two dots DLP may face each other with respect to the hole h, and one dot DLP may face the line LP with respect to the hole h.

The light pattern CLP may include a corner line CLP. The corner line CLP may extend while being bent or may have a fan shape or semicircular shape. For example, the corner line CLP may be a quarter circle. The corner line CLP may be positioned between the hole h closest to the second corner C2 and the second corner C2. The corner line CLP may be referred to as a curved line CLP. The dots DLP may be disposed around the hole h closest to the second corner C2. For example, the number of dots DLP may be five. The five dots DLP may be sequentially disposed around the hole h closest to the second corner C2 together with the corner line CLP. The dots DLP may face the corner line CLP with respect to the hole h. The description of the second corner C2 may be applied to other corners C1, C3, and C4.

Referring to FIG. 11, the reflective sheet 226 may include a first area DA1, a second area DA2, a third area DA3, a fourth area DA4, and a central area CDA. The area DA may be referred to as a dot area DA.

The first area DA1 may be formed to be elongated along the first side S1 and/or the fourth side S4. The first plurality of holes h may be sequentially formed in the first area DA1 while maintaining a constant interval. The first area DA1 may be in contact with the first side ST and/or the fourth side S4. The description of the first side ST and/or the fourth side S4 may be applied to other sides S2 and S3.

The second area DA2 may be formed to be elongated along the first side ST and/or the fourth side S4. The second plurality of holes h may be sequentially formed in the second area DA2 while maintaining a constant interval. The second area DA2 may be in contact with or adjacent to the first area DA1. The distance of the second area DA2 from the first side ST and/or the fourth side S4 may be greater than the distance of the first area DA1 from the first side ST and/or the fourth side S4. The first area DA1 may be positioned between the second area DA2 and the first side ST and/or the fourth side S4.

The third area DA3 may be formed to be elongated along the first side ST and/or the fourth side S4. A third plurality of holes h may be sequentially formed in the third area DA3 while maintaining a constant interval. The third area DA3 may be in contact with or adjacent to the second area DA2. The distance of the third area DA3 from the first side ST and/or the fourth side S4 may be greater than the distance of the second area DA2 from the first side ST and/or the fourth side S4. The second area DA2 may be positioned between the third area DA3 and the first area DA1.

The fourth area DA4 may be formed to be elongated along the first side S1. A fourth plurality of holes h may be sequentially formed in the fourth area DA4 while maintaining a constant interval. The fourth area DA4 may be in contact with or adjacent to the third area DA3. The distance of the fourth area DA4 from the first side S1 and/or the fourth side S4 may be greater than the distance of the third area DA3 from the first side S1 and/or the fourth side S4. The third area DA3 may be positioned between the fourth area DA4 and the second area DA2.

The central area CDA may be an area of *?*the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, the light pattern DLP may have a yellow-based color, with the naked eye. The light pattern DLP may convert blue-based light provided by the light source 224 (refer to FIG. 5) or the optical assembly 224 into white light.

As another example, the light pattern DLP may have black or gray-based color, with the naked eye. The light pattern DLP may absorb light provided by the light source 224 (refer to FIG. 5) or the optical assembly 224.

The light pattern DLP may include dots DLP. The dots DLP may be disposed around the hole h. The dots DLP may be disposed to surround the hole h.

First dots DLP1 may be disposed around at least one of the first plurality of holes h. For example, the number of the first dots DLP1 may be eight, and the eight first dots DLP1 may be sequentially positioned around the hole h while maintaining a constant interval.

Second dots DLP2 may be disposed around at least one of the second plurality of holes h. For example, the number of second dots DLP2 may be eight, and the eight second dots DLP2 may be sequentially positioned around the hole h while maintaining a constant interval.

Third dots DLP3 may be disposed around at least one of the plurality of third holes h. For example, the number of third dots DLP3 may be eight, and the eight third dots DLP3 may be sequentially positioned around the hole h while maintaining a constant interval.

Fourth dots DLP4 may be disposed around at least one of the plurality of fourth holes h. For example, the number of fourth dots DLP4 may be three or four, and four fourth dots DLP4 may be sequentially positioned around the hole h while maintaining a constant interval. The number of dots DLP4 around the hole h adjacent to the cut line CL1 may be three. The dot DLP4 may be excluded from an area adjacent to the cut line CL1 around the hole h.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4. As another example, the sizes of the first dot DLP1, the second dot DLP2, the third dot DLP3, and the fourth dot DLP4 may have the same size. When the sizes of the dots DLP are the same, the number of dots DLP may increase.

The description of the second corner C2 may be applied to other corners C1, C3, and C4.

Referring to FIG. 12, the reflective sheet 226 may include a first area DA1, a second area DA2, a third area DA3, a fourth area DA4, and a central area CDA. The area DA may be referred to as a dot area DA or a pattern area DA.

The first area DA1 may be formed to be elongated along the first side S1 and/or the fourth side S4. The first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3.

The second area DA2 may be formed to be elongated along the first side S1 and/or the fourth side S4. The second plurality of holes h may be sequentially formed in the second area DA2 while maintaining a constant interval. The second area DA2 may be in contact with or adjacent to the first area DA1. The distance of the second area DA2 from the first side S1 and/or the fourth side S4 may be greater than the distance of the first area DA1 from the first side S1 and/or the fourth side S4. The first area DA1 may be positioned between the second area DA2 and the first side S1 and/or the fourth side S4.

The third area DA3 may be formed to be elongated along the first side S1 and/or the fourth side S4. A third plurality of holes h may be sequentially formed in the third area DA3 while maintaining a constant interval. The third area DA3 may be in contact with or adjacent to the second area DA2. The distance of the third area DA3 from the first side S1 and/or the fourth side S4 may be greater than the distance of the second area DA2 from the first side S1 and/or the fourth side S4. The second area DA2 may be positioned between the third area DA3 and the first area DA1.

The fourth area DA4 may be formed to be elongated along the first side S1 and/or the fourth side S4. A fourth plurality of holes h may be sequentially formed in the fourth area DA4 while maintaining a constant interval. The fourth area DA4 may be in contact with or adjacent to the third area DA3. The distance of the fourth area DA4 from the first side S1 and/or the fourth side S4 may be greater than the distance of the third area DA3 from the first side S1 and/or the fourth side S4. The third area DA3 may be positioned between the fourth area DA4 and the second area DA2.

The central area CDA may be an area of the reflective sheet 226 excluding the first area DAL, the second area DA2, the third area DA3, and the fourth area DA4.

The light pattern DLP, LP may include a phosphor. The light pattern DLP, LP may include a red-based phosphor and a green-based phosphor. The light pattern DLP, LP may include a yellow-based phosphor.

For example, the light pattern DLP, LP may have a yellow-based color, with the naked eye. The light pattern DLP, LP may convert blue-based light provided by the light source 224 (refer to FIG. 5) or the optical assembly 224 into white light.

As another example, the light pattern DLP, LP may have black or gray-based color, with the naked eye. The light pattern DLP, LP may absorb light provided by the light source 224 (refer to FIG. 5) or the optical assembly 224.

The light pattern DLP may include dots DLP. The dots DLP may be disposed around the hole h. The dots DLP may be disposed to surround the hole h.

First dots DLP1 may be disposed around at least one of the first plurality of holes h. For example, the number of the first dots DLP1 may be eight, and the eight first dots DLP1 may be sequentially positioned around the hole h while maintaining a constant interval.

Second dots DLP2 may be disposed around at least one of the second plurality of holes h. For example, the number of second dots DLP2 may be eight, and the eight second dots DLP2 may be sequentially positioned around the hole h while maintaining a constant interval.

Third dots DLP3 may be disposed around at least one of the plurality of third holes h. For example, the number of third dots DLP3 may be eight, and the eight third dots DLP3 may be sequentially positioned around the hole h while maintaining a constant interval.

Fourth dots DLP4 may be disposed around at least one of the plurality of fourth holes h. For example, the number of fourth dots DLP4 may be three or four, and four fourth dots DLP4 may be sequentially positioned around the hole h while maintaining a constant interval. The number of dots DLP4 around the hole h adjacent to the cut line CL1 may be three. The dot DLP4 may be excluded from an area adjacent to the cut line CL1 around the hole h.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4. As another example, the sizes of the first dot DLP1, the second dot DLP2, the third dot DLP3, and the fourth dot DLP4 may have the same size. When the sizes of the dots DLP are the same, the number of dots DLP may increase.

The light pattern LP may include a plurality of segments LP. The plurality of segments LP may be an elongated line. Each of the plurality of lines LP may be positioned to correspond to each of the plurality of holes h. The plurality of lines LP may be positioned between the first plurality of holes h and the first side S1 and/or the fourth side S4. The plurality of lines LP may be positioned between the first dots DA1 and the first side S1 and/or the fourth side S4.

For example, the length of the line LP may correspond to the diameter of the hole h. As another example, the length of the line LP may be smaller than the diameter of the hole h. As another example, the length of the line LP may be greater than the diameter of the hole h.

The description of the second corner C2 may be applied to other corners C1, C3, and C4.

Referring to FIG. 13, the reflective sheet 226 may include a first area DA1, a second area DA2, a third area DA3, a fourth area DA4, and a central area CDA. The area DA may be referred to as a dot area DA or a pattern area DA.

The first area DA1 may be formed to be elongated along the first side S1 and/or the fourth side S4. The first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3.

The second area DA2 may be formed to be elongated along the first side S1 and/or the fourth side S4. The second plurality of holes h may be sequentially formed in the second area DA2 while maintaining a constant interval. The second area DA2 may be in contact with or adjacent to the first area DA1. The distance of the second area DA2 from the first side S1 and/or the fourth side S4 may be greater than the distance of the first area DA1 from the first side S1 and/or the fourth side S4. The first area DA1 may be positioned between the second area DA2 and the first side S1 and/or the fourth side S4.

The third area DA3 may be formed to be elongated along the first side S1 and/or the fourth side S4. A third plurality of holes h may be sequentially formed in the third area DA3 while maintaining a constant interval. The third area DA3 may be in contact with or adjacent to the second area DA2. The distance of the third area DA3 from the first side S1 and/or the fourth side S4 may be greater than the distance of the second area DA2 from the first side S1 and/or the fourth side S4. The second area DA2 may be positioned between the third area DA3 and the first area DA1.

The fourth area DA4 may be formed to be elongated along the fourth side S4. A fourth plurality of holes h may be sequentially formed in the fourth area DA4 while maintaining a constant interval. The fourth area DA4 may be in contact with or adjacent to the third area DA3. The distance of the fourth area DA4 from the first side S1 and/or the fourth side S4 may be greater than the distance of the third area DA3 from the first side S1 and/or the fourth side S4. The third area DA3 may be positioned between the fourth area DA4 and the second area DA2.

The central area CDA may be an area of the reflective sheet 226 excluding the first area DAL, the second area DA2, the third area DA3, and the fourth area DA4.

The light pattern DLP, CLP may include a phosphor. The light pattern DLP, CLP may include a red-based phosphor and a green-based phosphor. The light pattern DLP, CLP may include a yellow-based phosphor.

For example, the light pattern DLP, CLP may have a yellow-based color, with the naked eye. The light pattern DLP, CLP may convert blue-based light provided by the light source 224 (refer to FIG. 5) or the optical assembly 224 into white light.

As another example, the light pattern DLP, CLP may have black or gray-based color, with the naked eye. The light pattern DLP, CLP may absorb light provided by the light source 224 (refer to FIG. 5) or the optical assembly 224.

The light pattern DLP may include dots DLP. The dots DLP may be disposed around the hole h. The dots DLP may be disposed to surround the hole h.

The curved line CLP may be disposed around at least one hole h among the first plurality of holes h. The curved line CLP may have a ring shape as a whole. The curved line CLP may be elongated along the external diameter of the hole h. A portion of the curved line CLP may be opened. The open portion of the curved line CLP may face the first side S1 or the fourth side S4.

Second dots DLP2 may be disposed around at least one of the second plurality of holes h. For example, the number of second dots DLP2 may be eight, and the eight second dots DLP2 may be sequentially positioned around the hole h while maintaining a constant interval.

Third dots DLP3 may be disposed around at least one of the plurality of third holes h. For example, the number of third dots DLP3 may be eight, and the eight third dots DLP3 may be sequentially positioned around the hole h while maintaining a constant interval.

Fourth dots DLP4 may be disposed around at least one of the plurality of fourth holes h. For example, the number of fourth dots DLP4 may be three or four, and four fourth dots DLP4 may be sequentially positioned around the hole h while maintaining a constant interval. The number of dots DLP4 around the hole h adjacent to the cut line CL1, CL2, CL3 may be three. The dot DLP4 may be excluded from an area adjacent to the cut line CL1, CL2, CL3 around the hole h.

For example, the size of the second dot DLP2 may be greater than the size of the third dot DLP3. The size of the third dot DLP3 may be greater than the size of the fourth dot DLP4. As another example, the sizes of the second dot DLP2, the third dot DLP3, and the fourth dot DLP4 may have the same size. When the sizes of the dots DLP are the same, the number of dots DLP may increase.

The description of the second corner C2 may be applied to other corners C1, C3, and C4.

Referring to FIG. 14, the reflective sheet 226 may include a first area DA1, a second area DA2, a third area DA3, and a fourth area DA4. The area DA may be referred to as a dot area DA or a pattern area DA.

The first area DA1 may be formed to be elongated along the first side S1 and/or the fourth side S4. The first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3 (refer to FIG. 7).

The second area DA2 may be formed to be elongated along the first side S1 and/or the fourth side S4. The second plurality of holes h may be sequentially formed in the second area DA2 while maintaining a constant interval. The second area DA2 may be in contact with or adjacent to the first area DA1. The distance of the second area DA2 from the first side S1 and/or the fourth side S4 may be greater than the distance of the first area DA1 from the first side S1 and/or the fourth side S4. The first area DA1 may be positioned between the second area DA2 and the first side S1 and/or the fourth side S4.

The third area DA3 may be formed to be elongated along the first side S1 and/or the fourth side S4. A third plurality of holes h may be sequentially formed in the third area DA3 while maintaining a constant interval. The third area DA3 may be in contact with or adjacent to the second area DA2. The distance of the third area DA3 from the first side S1 and/or the fourth side S4 may be greater than the distance of the second area DA2 from the first side S1 and/or the fourth side S4. The second area DA2 may be positioned between the third area DA3 and the first area DA1.

The fourth area DA4 may be formed to be elongated along the first side S1. A fourth plurality of holes h may be sequentially formed in the fourth area DA4 while maintaining a constant interval. The fourth area DA4 may be in contact with or adjacent to the third area DA3. The distance of the fourth area DA4 from the first side S1 and/or the fourth side S4 may be greater than the distance of the third area DA3 from the first side S1 and/or the fourth side S4. The third area DA3 may be positioned between the fourth area DA4 and the second area DA2.

The light pattern DLP, CLP may include a phosphor. The light pattern DLP, CLP may include a red-based phosphor and a green-based phosphor. The light pattern DLP, CLP may include a yellow-based phosphor.

For example, the light pattern DLP, CLP may have a yellow-based color, with the naked eye. The light pattern DLP, CLP may convert blue-based light provided by the light source 224 (refer to FIG. 5) or the optical assembly 224 into white light.

As another example, the light pattern DLP, CLP may have black or gray-based color, with the naked eye. The light pattern DLP, CLP may absorb light provided by the light source 224 (refer to FIG. 5) or the optical assembly 224.

The light pattern DLP may include dots DLP. The dots DLP may be disposed around the hole h. The dots DLP may be disposed to surround the hole h.

The curved line CLP may be disposed around at least one hole h among the first plurality of holes h. The curved line CLP may have a ring shape, a semicircle shape, or a fan shape as a whole. The curved line CLP may be elongated in an arc along the external diameter of the hole h. A portion of the curved line CLP may be opened. The open portion of the curved line CLP may face the fourth side S4. The curved line CLP may be formed adjacent to the first side S1.

In the hole h adjacent to the first side S1, the curved line CLP1 may be positioned between the hole h and the first side S1. The dots DLP1 may face the curved line CLP1 with respect to the hole h. For example, the arc formed by the dots DLP1 may be larger than the arc formed by the curved line CLP1. As another example, five dots DLP1 may be disposed around the hole h, and the curved line CLP1 may be disposed in the remaining area. The curvature of the arc formed by the five dots DLP1 may be the same as the curvature of the arc formed by the curved line CLP1. In the hole h adjacent to the fourth side S4, the curved line CLP2 may be disposed around the hole h, and the open portion of the curved line CLP2 may face the fourth side S4. The width of the curved line CLP2 adjacent to the fourth side S4 may be substantially the same as the width of the curved line CLP1 adjacent to the first side S1.

Second dots DLP2 may be disposed around at least one of the second plurality of holes h. For example, the number of second dots DLP2 may be eight, and the eight second dots DLP2 may be sequentially positioned around the hole h while maintaining a constant interval. The number of dots DLP2 around the hole h adjacent to the cut line CL2 may be six. A dot DLP2 may be excluded from an area adjacent to the cut line CL2 around the hole h.

Third dots DLP3 may be disposed around at least one of the plurality of third holes h. For example, the number of third dots DLP3 may be eight, and the eight third dots DLP3 may be sequentially positioned around the hole h while maintaining a constant interval.

Fourth dots DLP4 may be disposed around at least one of the plurality of fourth holes h. For example, the number of fourth dots DLP4 may be three or four, and four fourth dots DLP4 may be sequentially positioned around the hole h while maintaining a constant interval. The number of dots DLP4 around the hole h adjacent to the cut line CL4 may be three. The dot DLP4 may be excluded from an area adjacent to the cut line CL4 around the hole h.

For example, the size of the second dot DLP2 may be greater than the size of the third dot DLP3. The size of the third dot DLP3 may be greater than the size of the fourth dot DLP4. As another example, the sizes of the second dot DLP2, the third dot DLP3, and the fourth dot DLP4 may have the same size. When the sizes of the dots DLP are the same, the number of dots DLP may increase.

The description of the second corner C2 may be applied to other corners C1, C3, and C4.

Referring to FIG. 15, the reflective sheet 226 may include a first area DA1, a second area DA2, a third area DA3, a fourth area DA4, a central area CDA, an intermediate area MDA1, MDA2, and a triangular area TDA. The area DA may be referred to as a dot area DA or a pattern area DA.

The first area DA1 may be formed to be elongated along the first side S1 and/or the fourth side S4. The first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3 (refer to FIG. 7).

The second area DA2 may be formed to be elongated along the first side S1 and/or the fourth side S4. The second plurality of holes h may be sequentially formed in the second area DA2 while maintaining a constant interval. The second area DA2 may be in contact with or adjacent to the first area DA1. The distance of the second area DA2 from the first side S1 and/or the fourth side S4 may be greater than the distance of the first area DA1 from the first side S1 and/or the fourth side S4. The first area DA1 may be positioned between the second area DA2 and the first side S1 and/or the fourth side S4.

The third area DA3 may be formed to be elongated along the first side S1 and/or the fourth side S4. A third plurality of holes h may be sequentially formed in the third area DA3 while maintaining a constant interval. The third area DA3 may be in contact with or adjacent to the second area DA2. The distance of the third area DA3 from the first side S1 and/or the fourth side S4 may be greater than the distance of the second area DA2 from the first side S1 and/or the fourth side S4. The second area DA2 may be positioned between the third area DA3 and the first area DA1.

The fourth area DA4 may be formed to be elongated along the first side S1 and/or the fourth side S4. A fourth plurality of holes h may be sequentially formed in the fourth area DA4 while maintaining a constant interval. The fourth area DA4 may be in contact with or adjacent to the third area DA3. The distance of the fourth area DA4 from the first side S1 and/or the fourth side S4 may be greater than the distance of the third area DA3 from the first side S1 and/or the fourth side S4. The third area DA3 may be positioned between the fourth area DA4 and the second area DA2.

The central area CDA may be an area of the reflective sheet 226 excluding the first area DAL, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, the light pattern DLP may have a yellow-based color, with the naked eye. The light pattern DLP may convert blue-based light provided by the light source 224 (refer to FIG. 5) or the optical assembly 224 into white light.

As another example, the light pattern DLP may have black or gray-based color, with the naked eye. The light pattern DLP may absorb light provided by the light source 224 (refer to FIG. 5) or the optical assembly 224.

The light pattern DLP may include dots DLP. The dots DLP may be disposed around the hole h. The dots DLP may be disposed to surround the hole h.

First dots DLP1 may be disposed around at least one of the first plurality of holes h. For example, the number of first dots DLP1 may be eight, and the eight first dots DLP1 may be sequentially positioned around the hole h while maintaining a constant interval.

Second dots DLP2 may be disposed around at least one of the second plurality of holes h. For example, the number of second dots DLP2 may be eight, and the eight second dots DLP2 may be sequentially positioned around the hole h while maintaining a constant interval.

Third dots DLP3 may be disposed around at least one of the plurality of third holes h. For example, the number of third dots DLP3 may be eight, and the eight third dots DLP3 may be sequentially positioned around the hole h while maintaining a constant interval.

Fourth dots DLP4 may be disposed around at least one of the plurality of fourth holes h. For example, the number of fourth dots DLP4 may be three or four, and four fourth dots DLP4 may be sequentially positioned around the hole h while maintaining a constant interval. The number of dots DLP4 around the hole h adjacent to the cut line CL1 may be three. The dot DLP4 may be excluded from an area adjacent to the cut line CL1 around the hole h.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4.

As another example, the sizes of the first dot DLP1, the second dot DLP2, the third dot DLP3, and the fourth dot DLP4 may have the same size. When the sizes of the dots DLP are the same, the number of dots DLP may increase.

The intermediate area MDA1 may be positioned between the first plurality of holes h. The intermediate area MDA1 may be formed between the first plurality of holes h adjacent to the first side S1. The intermediate area MDA1 may be formed to extend long in a direction of intersecting with or being perpendicular to the length direction of the first side S1. The dots DLP1 may be disposed in the intermediate area MDA1. For example, a plurality of dots DLP1 may be disposed in the length direction of the intermediate area MDA1. For example, the number of dots DLP1 may be two.

The intermediate area MDA2 may be positioned between the first plurality of holes h. The intermediate area MDA2 may be formed between the first plurality of holes h adjacent to the fourth side S4. A plurality of intermediate areas MDA2 may be formed between the first plurality of holes h adjacent to the fourth side S4. The intermediate area MDA2 may form a triangle. The dots DLP1 may be disposed in the intermediate area MDA2. For example, a plurality of dots DLP1 may be disposed in the intermediate area MDA2. For example, the number of dots DLP1 may be three.

The intermediate area MDA2 may be positioned between the second plurality of holes h. The intermediate area MDA2 may be formed between the second plurality of holes h adjacent to the fourth side S4. A plurality of intermediate areas MDA2 may be formed between the second plurality of holes h adjacent to the fourth side S4. The intermediate area MDA2 may form a triangle. The dots DLP2 may be disposed in the intermediate area MDA2. For example, a plurality of dots DLP2 may be disposed in the intermediate area MDA2. For example, the number of dots DLP2 may be three.

The intermediate area MDA2 may be formed between the first area DA1 and the second area DA2. The intermediate area MDA2 may be formed between the second area DA2 and the third area DA3. The intermediate area MDA2 may form a triangular area TDA as a whole throughout the second area DA2 and the third area DA3.

The description of the second corner C2 may be applied to other corners C1, C3, and C4.

Referring to FIG. 16, the reflective sheet 226 may include a first area DA1, a second area DA2, a third area DA3, a fourth area DA4, a central area CDA, and an intermediate area MDA1, MDA2. The area DA may be referred to as a dot area DA or a pattern area DA.

The first area DA1 may be formed to be elongated along the first side S1 and/or the fourth side S4. The first plurality of holes h may be sequentially formed in the first area DA1 while maintaining a constant interval. The first area DA1 may be in contact with the first side S1 and/or the fourth side S4. The description of the first side S1 and/or the fourth side S4 may be applied to other sides S2 and S3 (refer to FIG. 7).

The second area DA2 may be formed to be elongated along the first side S1 and/or the fourth side S4. The second plurality of holes h may be sequentially formed in the second area DA2 while maintaining a constant interval. The second area DA2 may be in contact with or adjacent to the first area DA1. The distance of the second area DA2 from the first side S1 and/or the fourth side S4 may be greater than the distance of the first area DA1 from the first side S1 and/or the fourth side S4. The first area DA1 may be positioned between the second area DA2 and the first side S1 and/or the fourth side S4.

The third area DA3 may be formed to be elongated along the first side S1 and/or the fourth side S4. A third plurality of holes h may be sequentially formed in the third area DA3 while maintaining a constant interval. The third area DA3 may be in contact with or adjacent to the second area DA2. The distance of the third area DA3 from the first side S1 and/or the fourth side S4 may be greater than the distance of the second area DA2 from the first side S1 and/or the fourth side S4. The second area DA2 may be positioned between the third area DA3 and the first area DA1.

The fourth area DA4 may be formed to be elongated along the first side S1 and/or the fourth side S4. A fourth plurality of holes h may be sequentially formed in the fourth area DA4 while maintaining a constant interval. The fourth area DA4 may be in contact with or adjacent to the third area DA3. The distance of the fourth area DA4 from the first side S1 and/or the fourth side S4 may be greater than the distance of the third area DA3 from the first side S1 and/or the fourth side S4. The third area DA3 may be positioned between the fourth area DA4 and the second area DA2.

The central area CDA may be an area of the reflective sheet 226 excluding the first area DAL, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, the light pattern DLP may have a yellow-based color, with the naked eye. The light pattern DLP may convert blue-based light provided by the light source 224 (refer to FIG. 5) or the optical assembly 224 into white light.

As another example, the light pattern DLP may have black or gray-based color, with the naked eye. The light pattern DLP may absorb light provided by the light source 224 (refer to FIG. 5) or the optical assembly 224.

The light pattern DLP may include dots DLP. The dots DLP may be disposed around the hole h. The dots DLP may be disposed to surround the hole h.

First dots DLP1 may be disposed around at least one of the first plurality of holes h. For example, the number of first dots DLP1 may be eight, and the eight first dots DLP1 may be sequentially positioned around the hole h while maintaining a constant interval.

Second dots DLP2 may be disposed around at least one of the second plurality of holes h. For example, the number of second dots DLP2 may be eight, and the eight second dots DLP2 may be sequentially positioned around the hole h while maintaining a constant interval.

Third dots DLP3 may be disposed around at least one of the plurality of third holes h. For example, the number of third dots DLP3 may be eight, and the eight third dots DLP3 may be sequentially positioned around the hole h while maintaining a constant interval.

Fourth dots DLP4 may be disposed around at least one of the plurality of fourth holes h. For example, the number of fourth dots DLP4 may be four, and four fourth dots DLP4 may be sequentially positioned around the hole h while maintaining a constant interval.

For example, the size of the first dot DLP1 may be greater than the size of the second dot DLP2. The size of the second dot DLP2 may be greater than the size of the third dot DLP3. The size of the third dot DLP3 may be greater than the size of the fourth dot DLP4.

As another example, the sizes of the first dot DLP1, the second dot DLP2, the third dot DLP3, and the fourth dot DLP4 may have the same size. When the sizes of the dots DLP are the same, the number of dots DLP may increase.

The intermediate area MDA1 may be positioned between the first plurality of holes h. The intermediate area MDA1 may be formed between the first plurality of holes h adjacent to the fourth side S4. The intermediate area MDA1 may be formed to extend long in a direction of intersecting with or being perpendicular to the length direction of the fourth side S4. The dots DLP1 may be disposed in the intermediate area MDA1. For example, a plurality of dots DLP1 may be disposed in the length direction of the intermediate area MDA1. For example, the number of dots DLP1 may be two.

The intermediate area MDA2 may be positioned between the first plurality of holes h. The intermediate area MDA2 may be formed between the first plurality of holes h adjacent to the first side S1. A plurality of intermediate areas MDA2 may be formed between the first plurality of holes h adjacent to the first side S1. The intermediate area MDA2 may form a triangle. The dots DLP1 may be disposed in the intermediate area MDA2. For example, a plurality of dots DLP1 may be disposed in the intermediate area MDA2. For example, the number of dots DLP1 may be three.

The intermediate area MDA1 may be positioned between the second plurality of holes h. The intermediate area MDA1 may be formed between the second plurality of holes h adjacent to the fourth side S4. The intermediate area MDA1 may be formed to extend long in a direction of intersecting with or being perpendicular to the length direction of the fourth side S4. The dots DLP2 may be disposed in the intermediate area MDA1. For example, a plurality of dots DLP2 may be disposed in the length direction of the intermediate area MDA1. For example, the number of dots DLP2 may be three.

The intermediate area MDA2 may be positioned between the second plurality of holes h. The intermediate area MDA2 may be formed between the plurality of second holes h adjacent to the first side S1. A plurality of intermediate areas MDA2 may be formed between a second plurality of holes h adjacent to the first side S1. The intermediate area MDA2 may form a triangle. The dots DLP2 may be disposed in the intermediate area MDA2. For example, a plurality of dots DLP2 may be disposed in the intermediate area MDA2. For example, the number of dots DLP2 may be three.

The intermediate area MDA1 may be positioned between the third plurality of holes h. The intermediate area MDA1 may be formed between the third plurality of holes h adjacent to the fourth side S4. The intermediate area MDA1 may be formed to extend long in a direction of intersecting with or being perpendicular to the length direction of the fourth side S4. The dots DLP3 may be disposed in the intermediate area MDA1. For example, a plurality of dots DLP3 may be disposed in the length direction of the intermediate area MDA1. For example, the number of dots DLP3 may be two.

The intermediate area MDA2 may be positioned between the third plurality of holes h. The intermediate area MDA2 may be formed between the third plurality of holes h adjacent to the first side S1. A plurality of intermediate areas MDA2 may be formed between the third plurality of holes h adjacent to the first side S1. The intermediate area MDA2 may form a triangle. The dots DLP3 may be disposed in the intermediate area MDA2. For example, a plurality of dots DLP3 may be disposed in the intermediate area MDA2. For example, the number of dots DLP3 may be three.

The intermediate area MDA2 may be formed between the first area DA1 and the second area DA2. The intermediate area MDA2 may be formed between the second area DA2 and the third area DA3.

The description of the second corner C2 may be applied to other corners C1, C3, and C4.

Referring to FIGS. 1 to 16, a display device according to an aspect of the present disclosure includes: a display panel; a frame which is positioned in a rearward direction of the display panel, and to which the display panel is coupled; a substrate configured to be positioned between the display panel and the frame, and fixed to the frame; a plurality of light sources configured to be mounted on the substrate to form a row and a column; a reflective sheet configured to be positioned on the substrate, and to have a plurality of holes through which each of the plurality of light sources passes; and a light pattern configured to be formed on the reflective sheet, and to convert a color of a light provided by the plurality of light sources, wherein the reflective sheet includes: a first hole positioned adjacent to an edge of the reflective sheet; a second hole configured to be positioned adjacent to the first hole and positioned farther than the first hole from the edge of the reflective sheet; a first area positioned around the first hole; and a second area positioned around the second hole, wherein the light pattern includes: a first light pattern positioned in the first area; and a second light pattern positioned in the second area, wherein an area of *?*the first light pattern is larger than an area of *?*the second light pattern.

According to another aspect of the present disclosure, the plurality of light sources provide blue-based light, and the light pattern includes a green-based phosphor or a red-based phosphor to convert the light provided from the plurality of light sources.

According to another aspect of the present disclosure with reference to FIG. 9, the first hole is plural, the plurality of first holes include: a corner hole positioned adjacent to a corner of the reflective sheet; and a side hole farther than the corner hole from the corner of the reflective sheet, and the first light pattern includes: a curved line positioned between the corner of the reflective sheet and the corner hole; and a line positioned between the edge of the reflective sheet and the side hole.

According to another aspect of the present disclosure with reference to FIG. 10, the first light pattern includes: a first plurality of dots disposed around the corner hole; and a second plurality of dots disposed around the side hole, wherein the number of the first plurality of dots is greater than the number of the second plurality of dots.

According to another aspect of the present disclosure with reference to FIG. 11, the first light pattern includes a first plurality of dots disposed in a circumference of the first hole, and the second light pattern includes a second plurality of dots disposed in a circumference of the second hole, wherein the number of the first plurality of dots is identical with the number of the second plurality of dots, and wherein a size of each of the first plurality of dots is larger than a size of each of the second plurality of dots.

According to another aspect of the present disclosure, the reflective sheet further includes: a third hole positioned farther than the second hole from the edge of the reflective sheet; and a third area positioned around the third hole, wherein the light pattern further includes a third light pattern positioned in the third area, wherein the third light pattern includes a third plurality of dots, wherein the number of the third plurality of dots is smaller than the number of the second plurality of dots, or a size of each of the third plurality of dots is smaller than a size of each of the second plurality of dots.

According to another aspect of the present disclosure with reference to FIG. 12, the first light pattern includes a first plurality of dots disposed in a circumference of the first hole, wherein the second light pattern inc includes a second plurality of dots disposed in a circumference of the second hole, wherein the number of the first plurality of dots is identical with the number of the second plurality of dots, wherein a size of each of the first plurality of dots is larger than or equal to a size of each of the second plurality of dots, wherein the first light pattern further includes a line positioned between the edge of the reflective sheet and the first plurality of dots.

According to another aspect of the present disclosure, the first light pattern includes a curved line disposed in a circumference of the first hole, wherein the second light pattern includes a second plurality of dots disposed in a circumference of the second hole.

According to another aspect of the present disclosure with reference to FIG. 13, the curved line surrounds the first hole, and has a ring shape having an open portion, wherein the open portion of the curved line faces an edge of the reflective sheet.

According to another aspect of the present disclosure with reference to FIG. 14, the first light pattern includes a curved line disposed in a circumference of the first hole and a first plurality of dots, wherein the second light pattern includes a second plurality of dots disposed in a circumference of the second hole.

According to another aspect of the present disclosure, the curved line is positioned between the first hole and the edge of the reflective sheet, wherein the first plurality of holes face the curved line with respect to the first hole.

According to another aspect of the present disclosure with reference to FIG. 15, the first hole is plural, wherein the plurality of first holes include: a corner hole positioned adjacent to a corner of the reflective sheet; and a side hole farther than the corner hole from the corner of the reflective sheet, wherein the first light pattern includes: a first plurality of dots positioned in a circumference of the corner hole; a second plurality of dots positioned in a circumference of the side hole; and a third plurality of dots positioned between the corner hole and the side hole, wherein the number of the first plurality of dots is identical with the number of the second plurality of dots, wherein the number of the third plurality of dots is smaller than the number of the first plurality of dots.

According to another aspect of the present disclosure with reference to FIGS. 15 and 16, the third plurality of holes define an intermediate area which is positioned between the corner hole and the side hole, and extends long in a direction of intersecting with the edge of the reflective sheet.

According to another aspect of the present disclosure with reference to FIGS. 15 and 16, the third plurality of holes define an intermediate area which is positioned between the corner hole and the side hole, and forms a triangle.

According to another aspect of the present disclosure with reference to FIGS. 1 and 16, the display device further includes an optical sheet which is positioned between the plurality of light sources and the display panel, and includes a green-based phosphor and a red-based phosphor.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of the invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

The invention claimed is:

1. A display device comprising:
   a display panel;
   a frame coupled at a rear of the display panel;
   a substrate coupled to the frame and positioned between the display panel and the frame;
   a plurality of light sources mounted on the substrate;
   a reflective sheet at a front of the substrate and comprising a plurality of holes corresponding to the plurality of light sources; and
   a plurality of light patterns formed on the reflective sheet and configured to convert a color of light provided by the plurality of light sources,
   wherein:
   the reflective sheet comprises a first area positioned adjacent to an edge of the reflective sheet and a second area positioned further inward from the first area;
   a first hole of the plurality of holes positioned in the first area; and
   a second hole of the plurality of holes positioned in the second area,
   the plurality of light patterns comprises a first light pattern positioned in the first area and a second light pattern positioned in the second area,
   the first light pattern comprises a first plurality of dots and a curved line disposed along a circumference of the first hole,
   the second light pattern comprises a second plurality of dots disposed along a circumference of the second hole, and
   the curved line is positioned between the first hole and the edge of the reflective sheet and the first plurality of dots are positioned opposite to the curved line with respect to the first hole.

2. The display device of claim 1, further comprising an optical sheet which is positioned between the plurality of light sources and the display panel, and comprises a green-based phosphor and a red-based phosphor.

3. The display device of claim 1, wherein the first area comprises a first portion and a second portion,
   wherein the first portion of the first area is disposed along a first edge of the reflective sheet and the second portion of the first area is disposed along an adjacent second edge of the reflective sheet to form a corner of the reflective sheet between the first edge and the second edge,
   wherein the first hole is one of a plurality of first portion holes positioned in the first portion, and
   wherein the second portion comprises a plurality of second portion holes.

4. The display device of claim 3, wherein the first light pattern further comprises a second portion curved line disposed along a circumference of a second portion hole of the plurality of second portion holes.

5. The display device of claim 4, wherein a length of the second portion curved line is longer than a length of the curved line disposed along a circumference of the first hole.

6. The display device of claim 4, wherein the second portion curved line is disposed along more than half of the circumference of the second portion hole.

7. The display device of claim 6, wherein an open circumferential portion between ends of the second portion curved line faces toward the second edge of the reflective sheet.

8. The display device of claim 7, wherein open circumferential portions of second portion curved lines corresponding to each of the plurality of second portion holes in the second portion face a same direction toward the second edge of the reflective sheet.

9. The display device of claim 3, wherein the reflective sheet further comprises:
   a third area positioned further inward from the second area and comprising a third light pattern of the plurality of light patterns corresponding to holes in the third area; and
   a fourth area positioned further inward from the third area and comprising a fourth light pattern of the plurality of light patterns corresponding to holes in the fourth area,
   wherein the third light pattern and the fourth light pattern are different.

10. The display device of claim 9, wherein the third light pattern and the fourth light pattern are each comprised of dots disposed around circumferences of the holes in the third area and fourth area, respectively.

11. The display device of claim 10, wherein a number of dots disposed around a hole in the fourth area is less than a number of dots disposed around a hole in the third area.

* * * * *